United States Patent
Lee et al.

(10) Patent No.: US 9,470,894 B2
(45) Date of Patent: Oct. 18, 2016

(54) HEAD MOUNTED DISPLAY AND METHOD OF CONTROLLING THE SAME

(71) Applicant: LG ELECTRONICS INC., Seoul (KR)

(72) Inventors: Doyoung Lee, Seoul (KR); Jongho Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 128 days.

(21) Appl. No.: 14/477,342

(22) Filed: Sep. 4, 2014

(65) Prior Publication Data
US 2015/0370072 A1 Dec. 24, 2015

(30) Foreign Application Priority Data
Jun. 23, 2014 (KR) .................. 10-2014-0076694

(51) Int. Cl.
G09G 5/00 (2006.01)
G02B 27/01 (2006.01)
G06T 19/00 (2011.01)

(52) U.S. Cl.
CPC ........ *G02B 27/0172* (2013.01); *G02B 27/0179* (2013.01); *G06T 19/006* (2013.01); *G02B 2027/0134* (2013.01); *G02B 2027/0138* (2013.01); *G02B 2027/0178* (2013.01); *G02B 2027/0187* (2013.01)

(58) Field of Classification Search
CPC  G02B 27/0093; G02B 27/01; G02B 27/017; G02B 27/0172–27/0179; G02B 2027/0118; G02B 2027/0178; G02B 2027/0187; G06K 9/00221; G06K 9/00208; G06K 9/00335; G06K 9/00677; G06F 3/012; G06F 3/03547; G06F 3/04883

USPC .................................. 345/7–8, 156, 173, 11
See application file for complete search history.

(56) References Cited

U.S. PATENT DOCUMENTS

| | | | |
|---|---|---|---|
| 2001/0038360 A1 | 11/2001 | Fukushima et al. | |
| 2010/0085462 A1 | 4/2010 | Sako et al. | |
| 2012/0242560 A1 | 9/2012 | Nakada et al. | |
| 2014/0160170 A1* | 6/2014 | Lyons | G09G 5/38 345/676 |

FOREIGN PATENT DOCUMENTS

| | | |
|---|---|---|
| JP | 2007-52224 A | 3/2007 |
| JP | 2007-134785 A | 5/2007 |

* cited by examiner

*Primary Examiner* — Jennifer Nguyen
(74) *Attorney, Agent, or Firm* — Birch, Stewart, Kolasch & Birch, LLP

(57) ABSTRACT

Disclosed is a head mounted display (HMD) that provide contents to a user in a state of being worn on a user's head. The HMD includes a display unit configured to include a first region, which displays first contents, and a second region which is disposed next to both sides of the first region and display second contents associated with the first contents, a sensing unit configured to sense a motion of a head of a user wearing the HMD in a state where the HMD is worn on the head of the user, and a controller configured to, based on the sensing result, when a state in which a movement of the HMD is limited is sensed, determine a direction in which the movement of the HMD is limited, and change a display position of at least one portion of second contents which are displayed in a region corresponding to the determined direction in the second region which is disposed next to both sides of the first region.

20 Claims, 21 Drawing Sheets

FIG. 3A
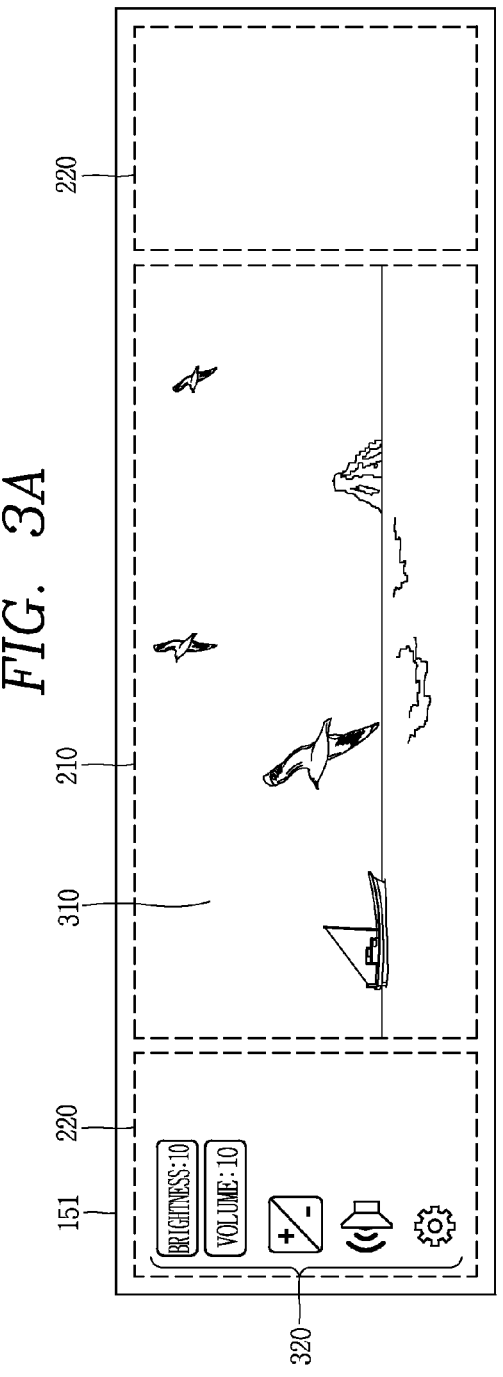
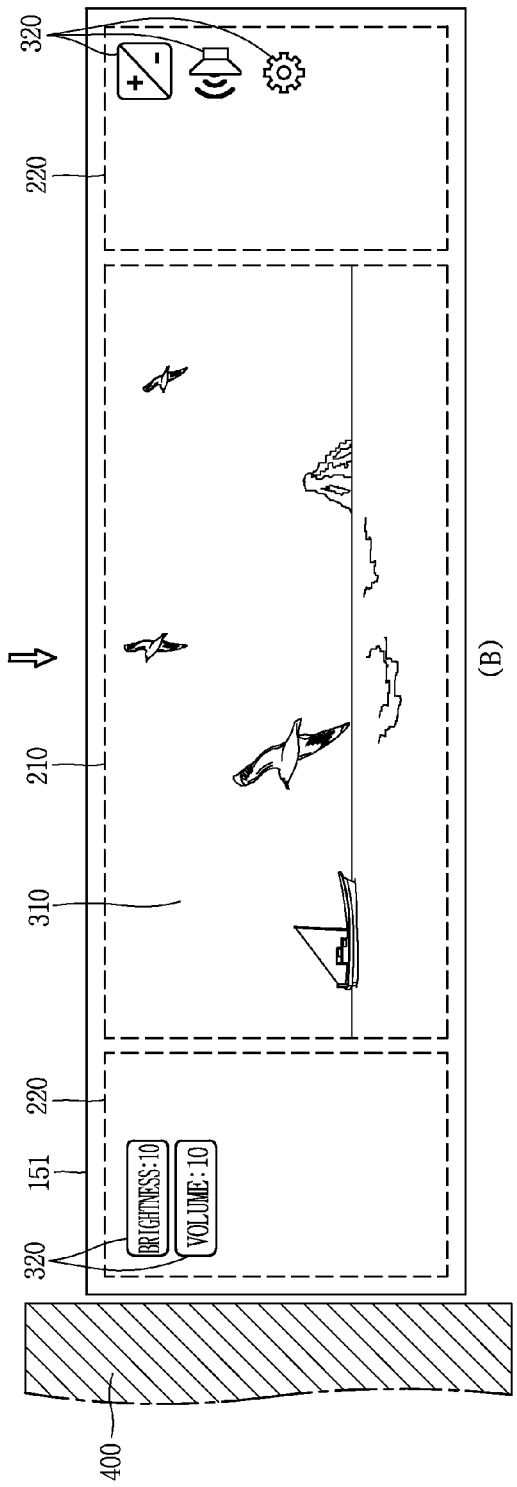

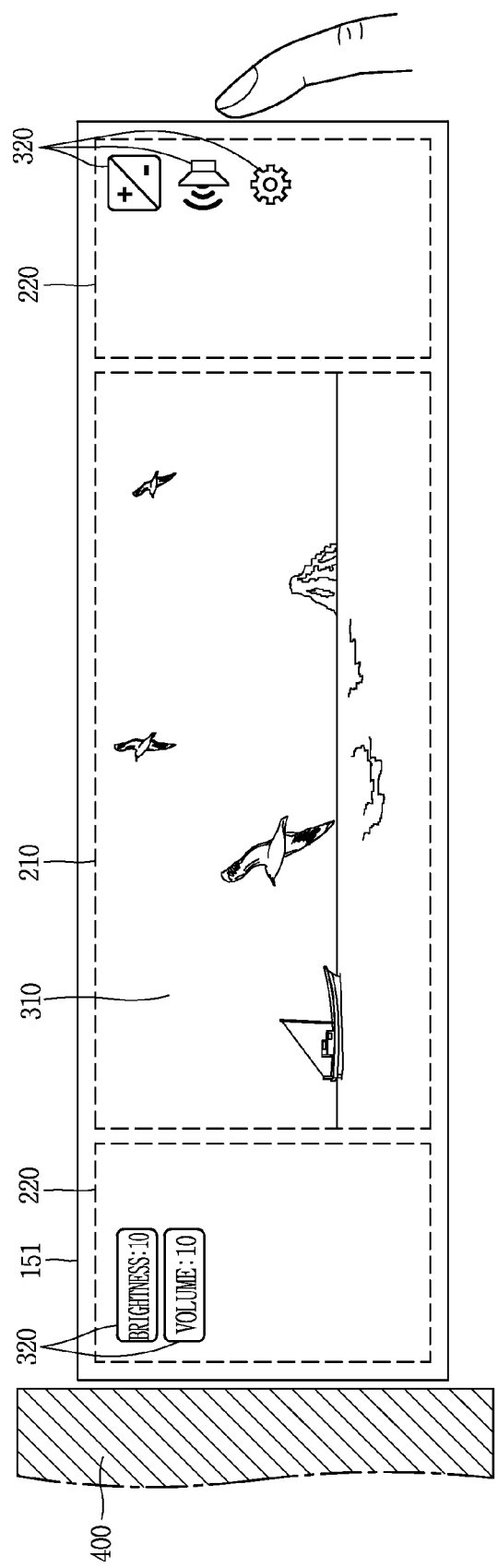
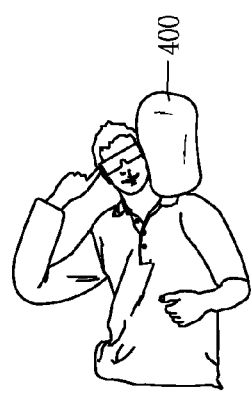
FIG. 3B

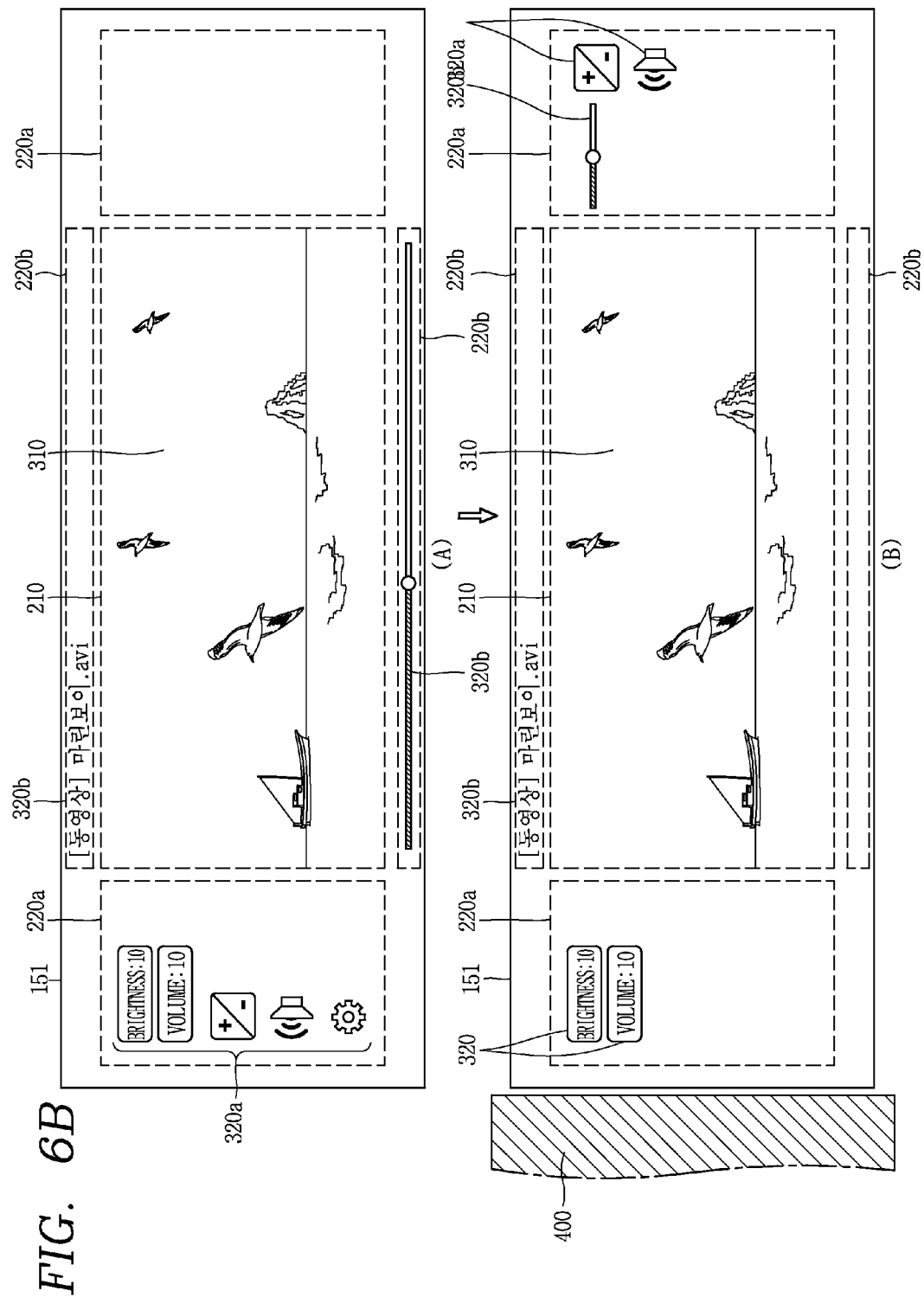

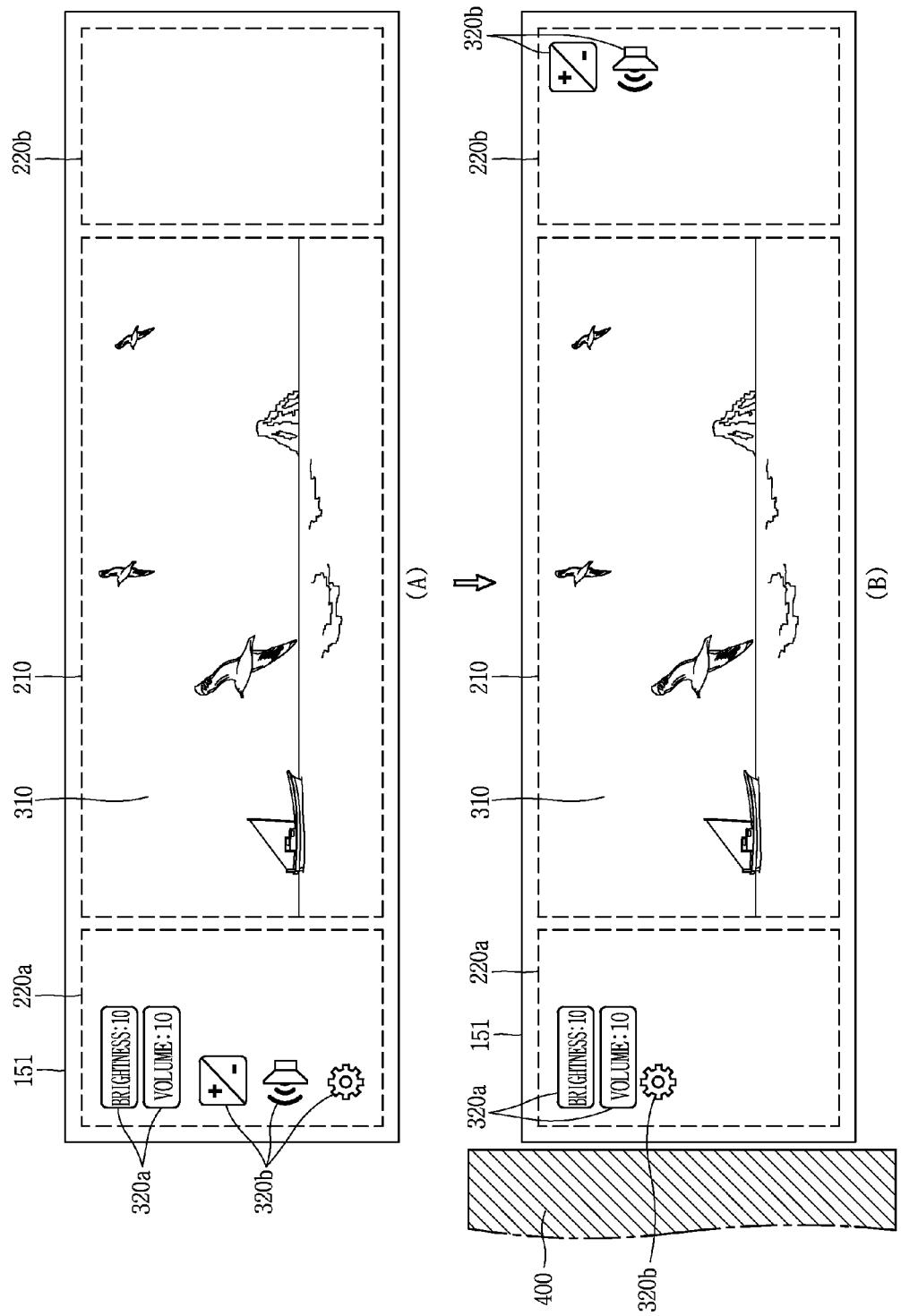

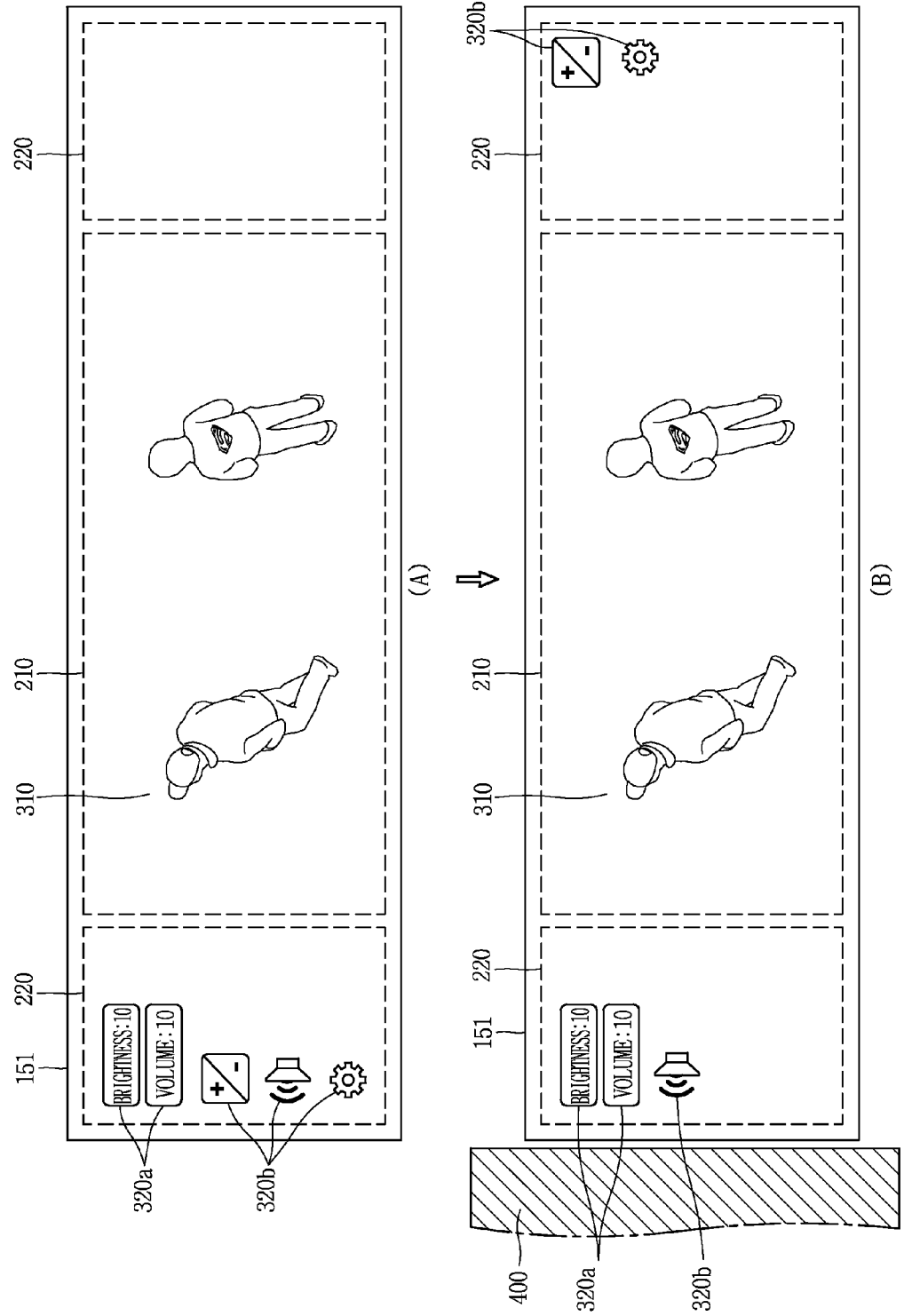

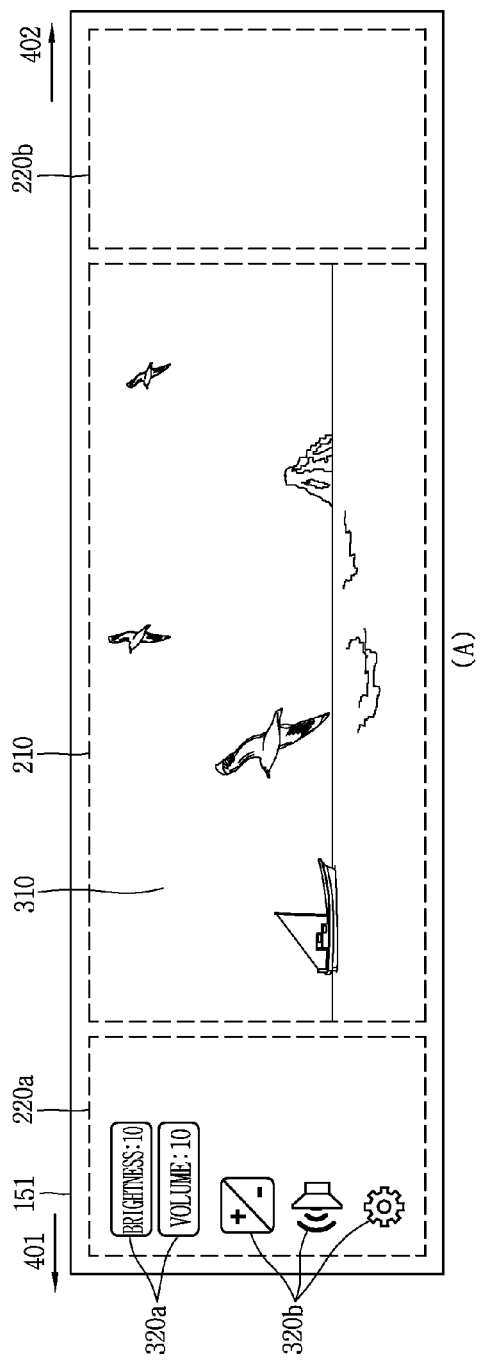
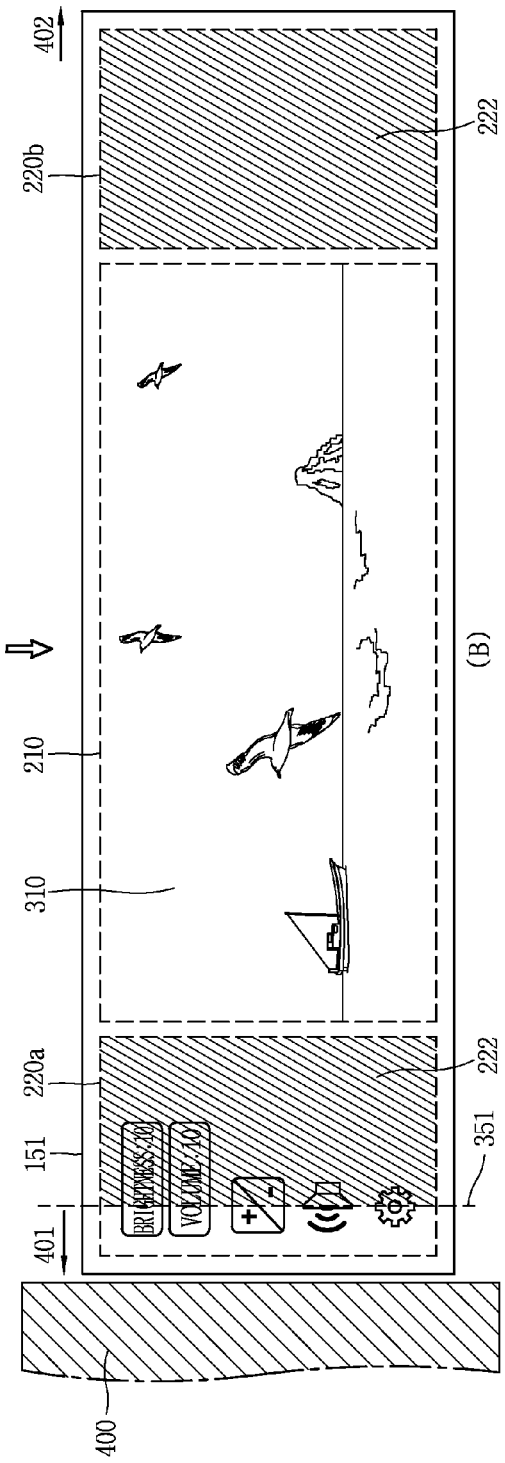
FIG. 8A

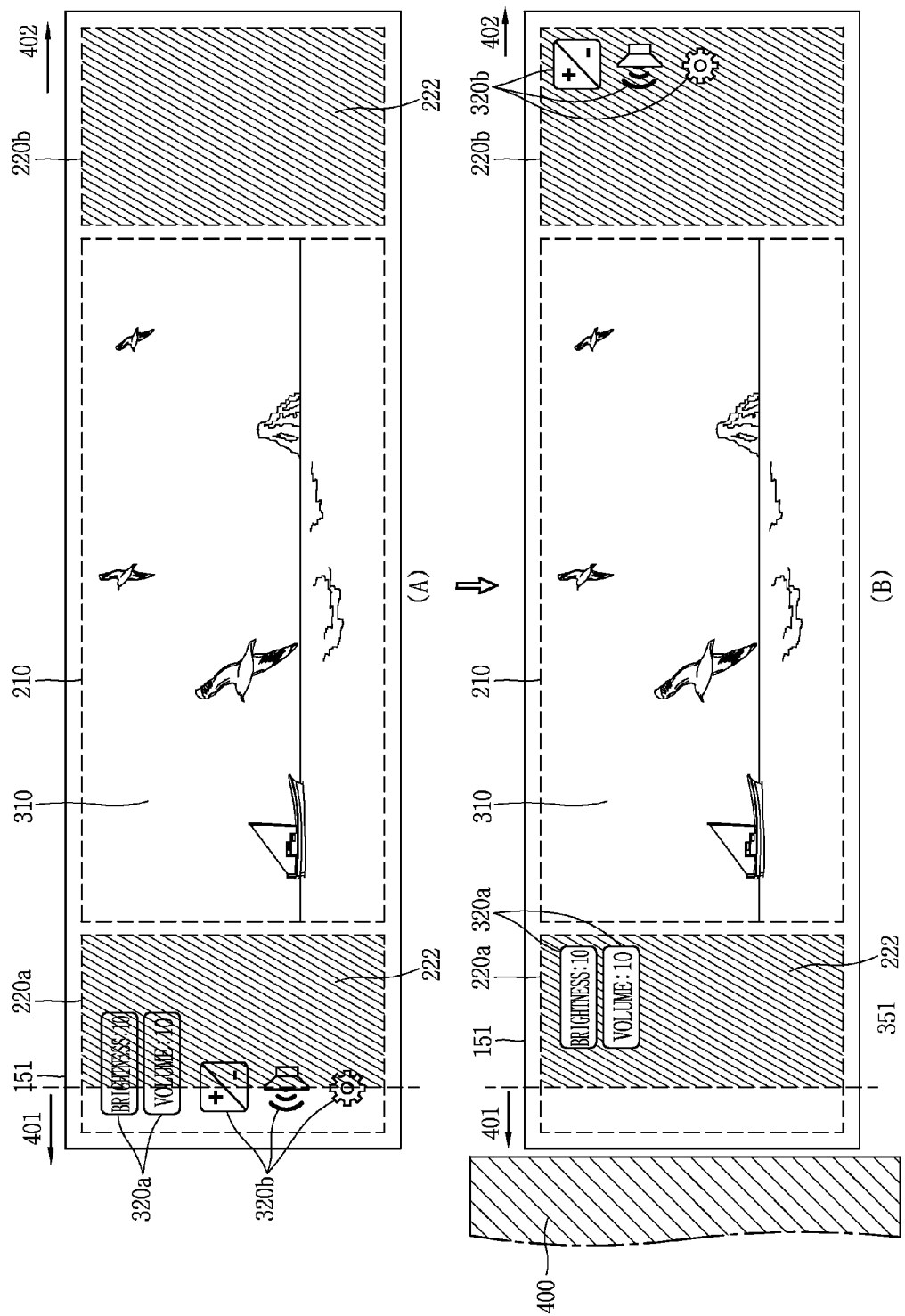

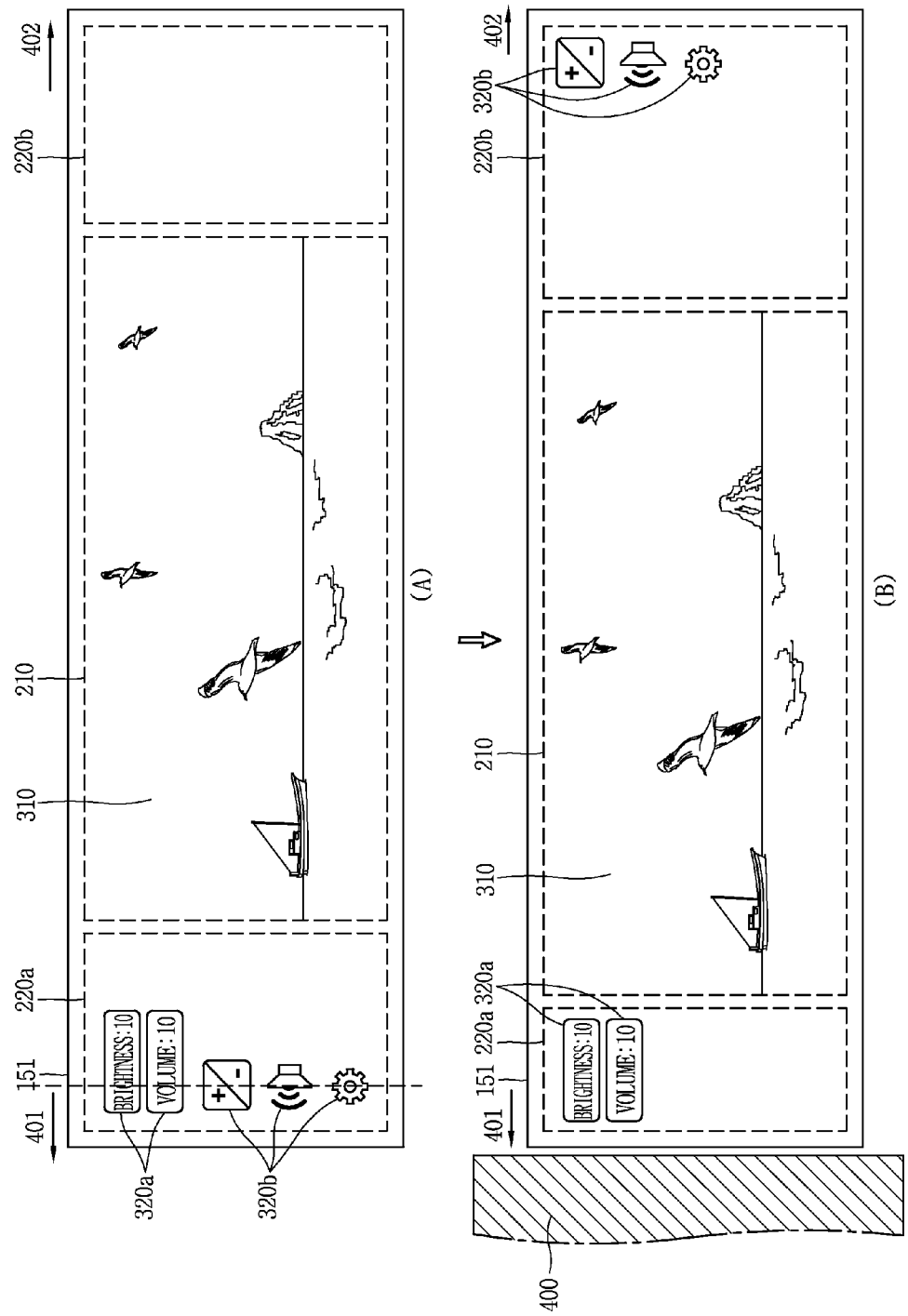

FIG. 9A
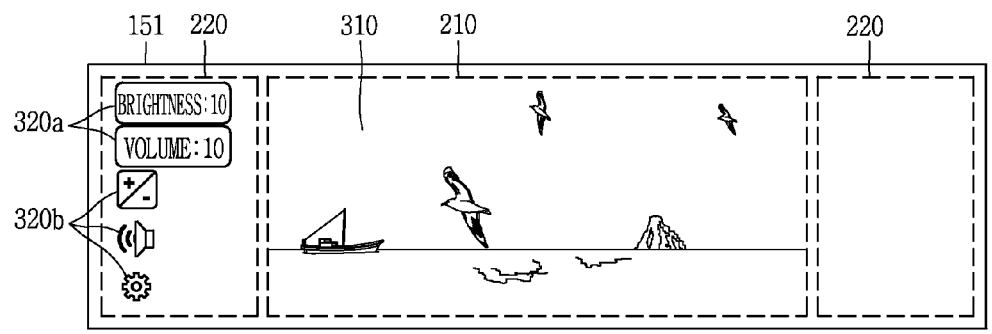
(A)
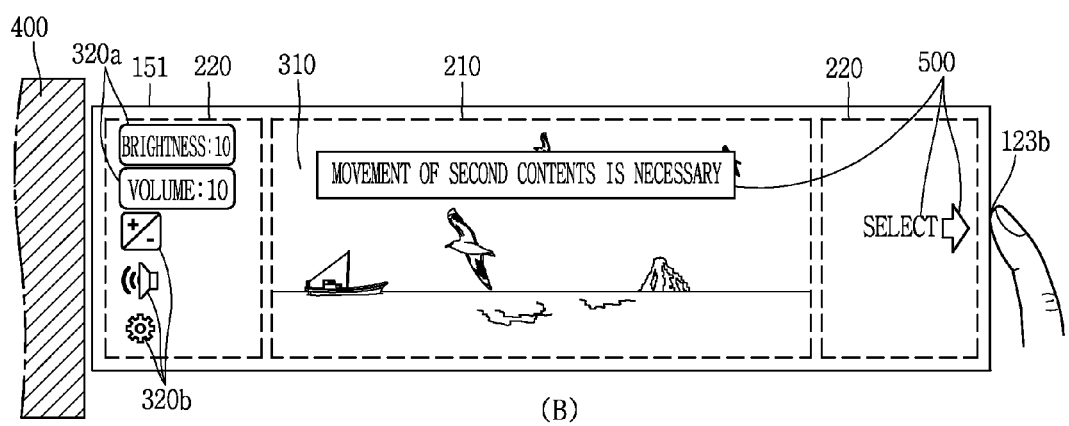
(B)
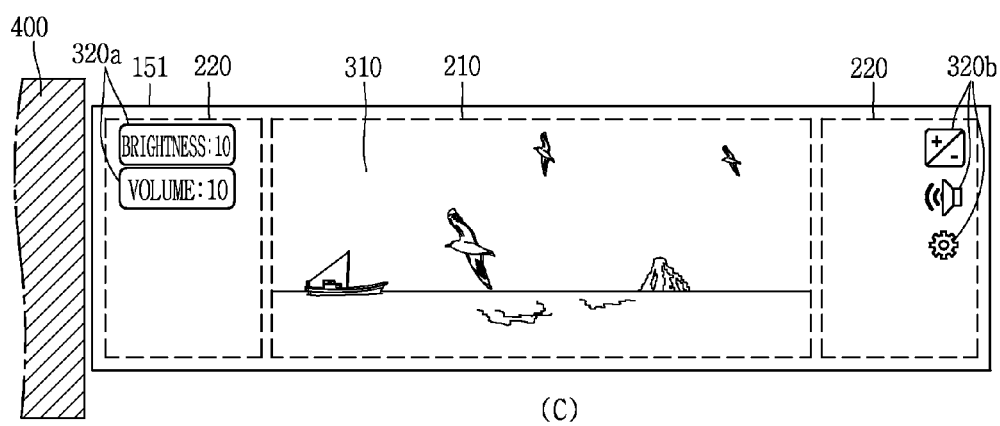
(C)

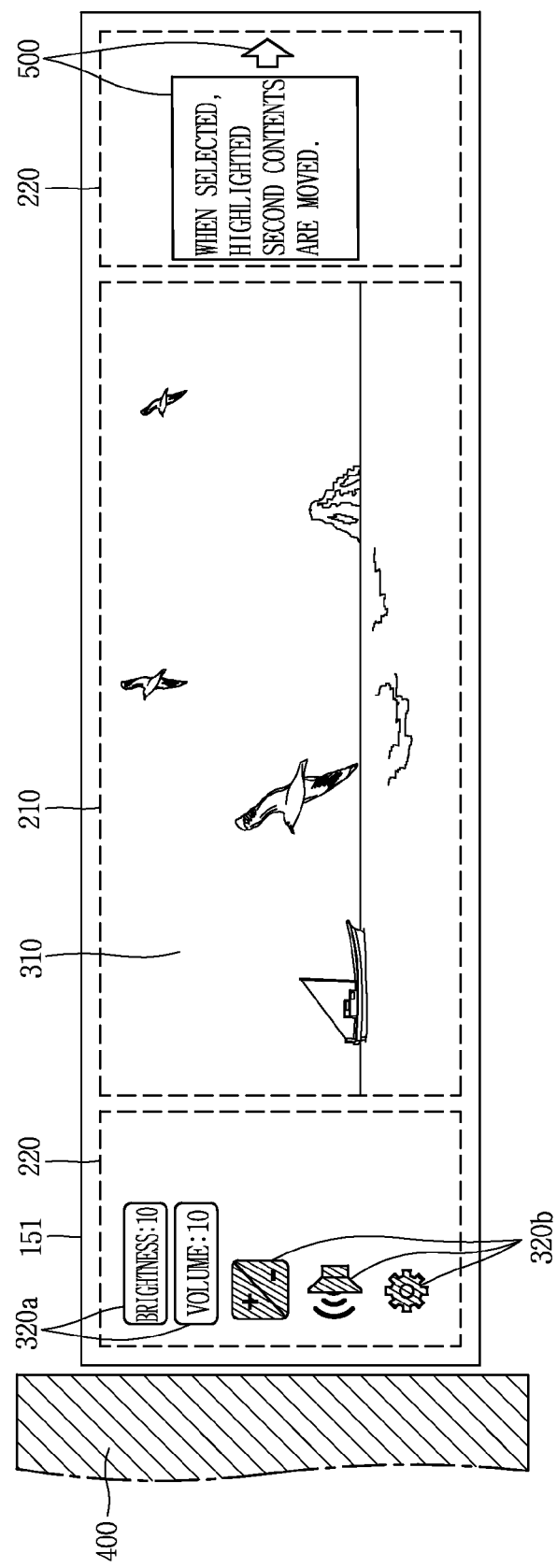

FIG. 11A
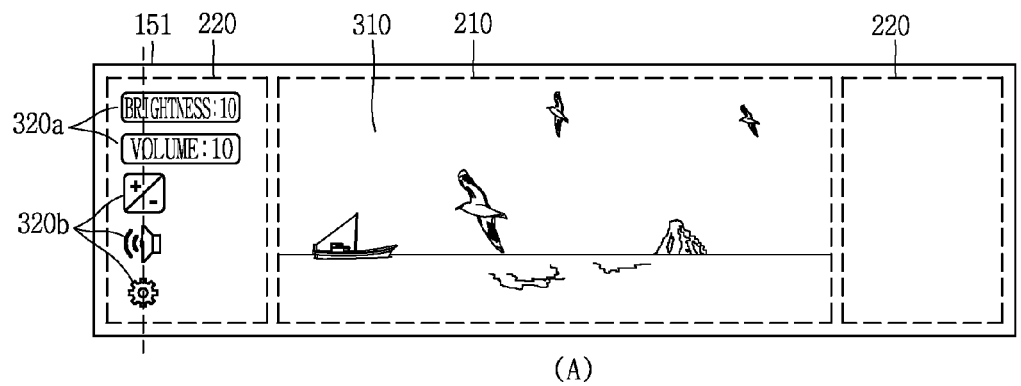
(A)
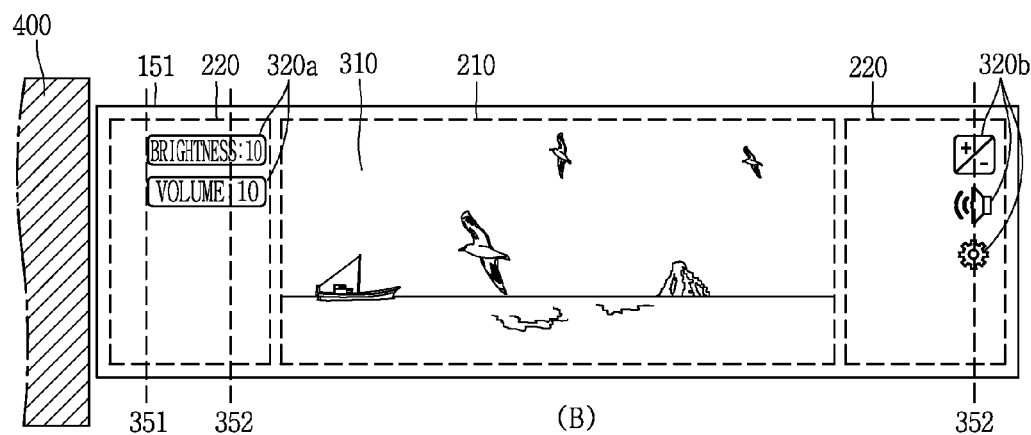
(B)
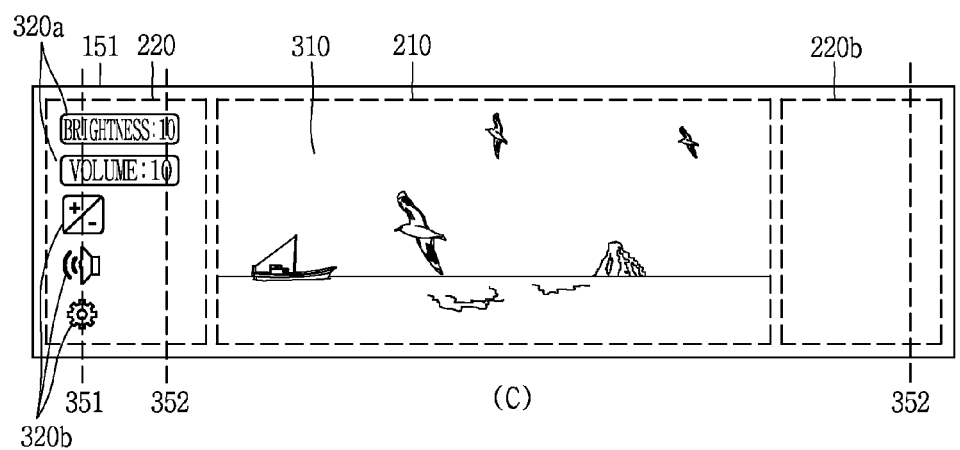
(C)

FIG. 11B
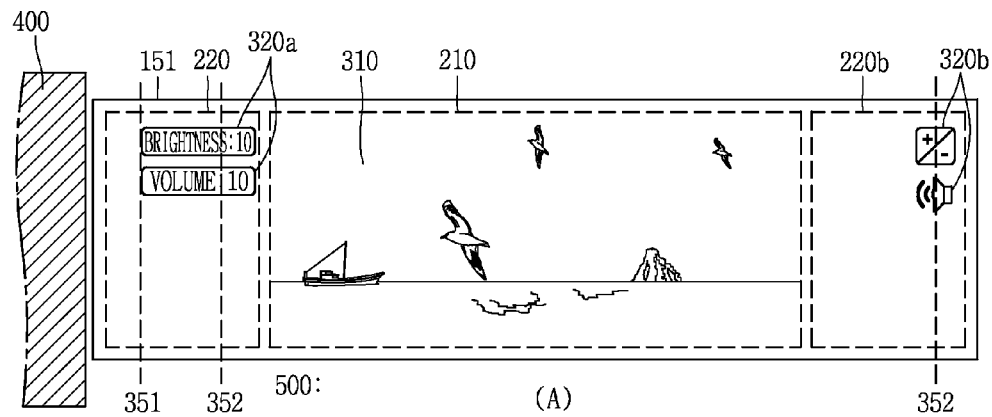
(A)
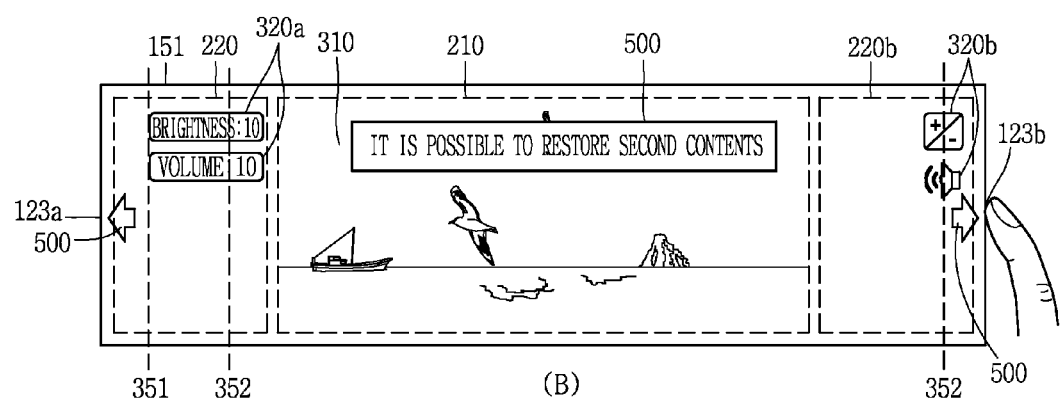
(B)
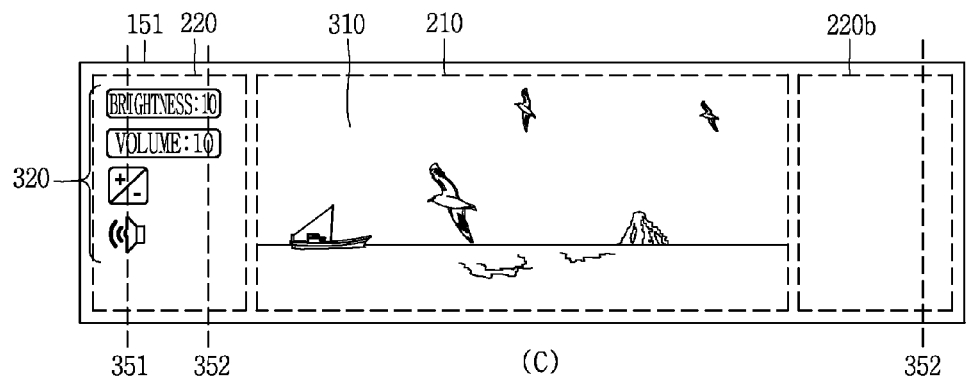
(C)

FIG. 11C
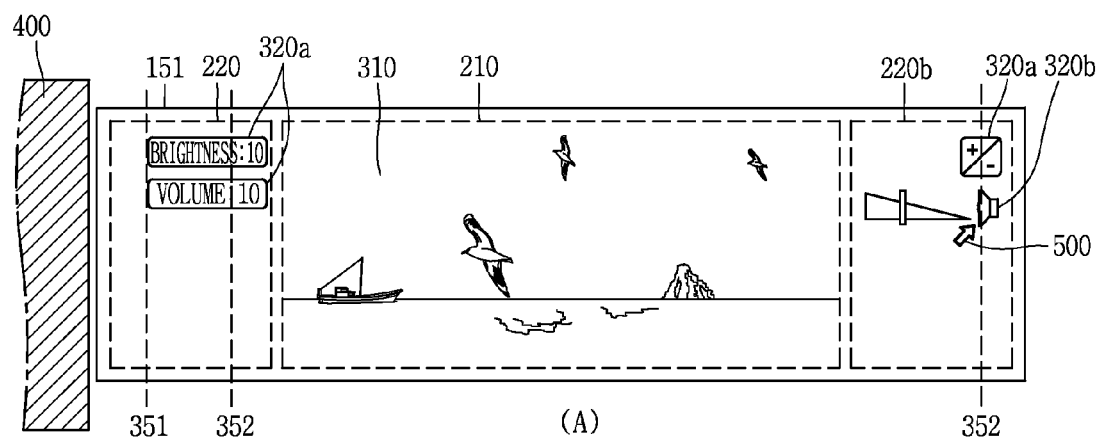
(A)
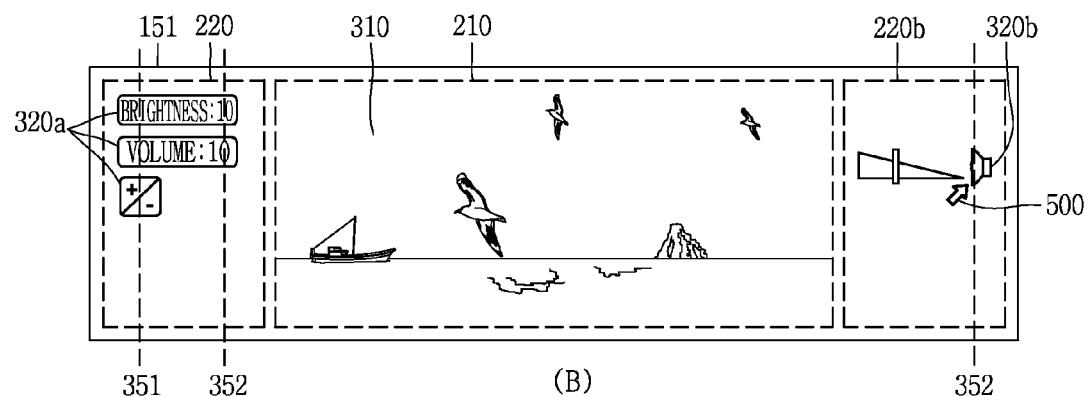
(B)
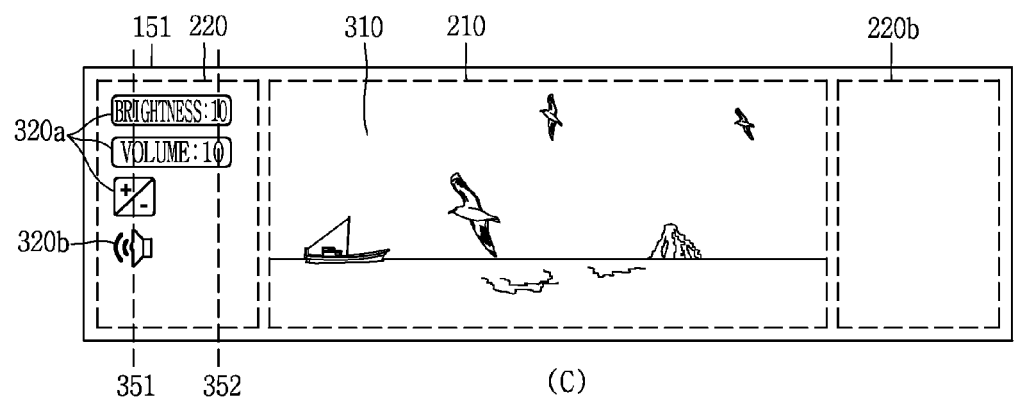
(C)

HEAD MOUNTED DISPLAY AND METHOD OF CONTROLLING THE SAME

CROSS-REFERENCE TO RELATED APPLICATION

Pursuant to 35 U.S.C. §119(a), this application claims the benefit of earlier filing date and right of priority to Korean Application No. 10-2014-0076694, filed on Jun. 23, 2014, the contents of which is incorporated by reference herein in its entirety.

BACKGROUND OF THE DISCLOSURE

1. Field of the Disclosure

The present disclosure relates to a head mounted display (HMD) that provide contents to a user in a state of being worn on a user's head.

2. Background of the Disclosure

HMDs denote various image display devices that are worn on a user's head like glasses, and enable the user to view a video (contents). With the lightening and miniaturizing trend of digital devices, various wearable computers are being developed, and the HMDs are being widely used. In addition to a simple display function, the HMDs provide various conveniences to a user in combination with augmented reality (AR) technology and N screen technology.

The HMDs may be controlled by various methods. As a representative example, a user may control an HMD with its arm in a state where the user wears the HMD. In detail, the user may directly touch a user input unit included in a body of the HMD, thereby controlling contents displayed by the HMD.

When desiring to control the HMD by using the above-described method, controlling the contents displayed by the HMD is limited depending on the user's posture or an ambient environment. For example, when the lies on its side or is adjacent to a peripheral object, a movement of one of both arms which are capable of controlling the HMD is limited. Therefore, a movement of one arm of the user is limited, and for this reason, it is inconvenient to control the HMD.

SUMMARY OF THE DISCLOSURE

Therefore, an aspect of the detailed description is to provide an HMD and a method of controlling the same, which can optimally provide contents output from the HMD.

Another aspect of the detailed description is to provide an HMD and a method of controlling the same, which can provide an optimized user interface, based on a user's posture or an ambient environment.

To achieve these and other advantages and in accordance with the purpose of this specification, as embodied and broadly described herein, a head mounted display (HMD) includes: a display unit configured to include a first region, which displays first contents, and a second region which is disposed next to both sides of the first region and displays second contents associated with the first contents; a sensing unit configured to sense a motion of a head of a user wearing the HMD in a state where the HMD is worn on the head of the user; and a controller configured to, based on the sensing result, when a state in which a movement of the HMD is limited is sensed, determine a direction in which the movement of the HMD is limited, and change a display position of at least one portion of second contents which are displayed in a region corresponding to the determined direction in the second region which is disposed next to both sides of the first region, wherein when the at least one portion of the second contents is displayed at a first display position in the region corresponding to the determined direction, the controller determines a display position of the at least one portion of the second contents so that the at least one portion of the second contents is displayed at a second display position which differs from the first display position, and displays the at least one portion of the second contents at the second display position, based on the determination.

According to an embodiment, the state in which the movement of the HMD is limited may be sensed based on that the motion of the head of the user wearing the HMD satisfies a predetermined condition, and the predetermined condition may include at least one of a case in which the HMD is inclined to correspond to a predetermined angle according to the movement, a case in which the HMD rotates to correspond to a predetermined distance according to the movement, and a case in which an object is within a predetermined distance from the HMD according to the movement.

According to an embodiment, when the predetermined condition is satisfied according to the head of the user wearing the HMD being moved in one direction, the controller may determine the one direction as a direction in which the movement of the HMD is limited.

According to an embodiment, a region corresponding to the determined direction may be a region which is disposed at a side corresponding to the one direction in the second region with respect to the first region.

According to an embodiment, the second region which is disposed at both sides with respect to the first region may include at least two regions, which are respectively disposed at a left side and a right side with respect to the first region, or at least two regions which are respectively disposed at an upper side and a lower side with respect to the first region.

According to an embodiment, the second contents may include at least one of detailed information associated with the first contents and a control icon for performing control associated with the first contents.

According to an embodiment, the controller may move at least one portion of the control icon, included in the second contents displayed at the first display position, to the second display position, based on that the state in which the movement of the HMD is limited is sensed.

According to an embodiment, a control icon corresponding to the at least one portion moved to the second display position may be determined based on a kind of the first contents, the presence of user designation, or a degree to which the movement of the HMD is limited.

According to an embodiment, based on the determined direction, the controller may determine, as the second display position, at least one portion of a region disposed in a direction opposite to the determined direction with respect to the first display position in the second region.

According to an embodiment, the second contents may include at least one of detailed information associated with the first contents and a control icon for performing control associated with the first contents, and the controller may differently determine a display position, in which the second contents are displayed, in the at least one portion corresponding to the determined second display position, based on to a kind of the second contents.

According to an embodiment, when at least one portion of the second contents is the detailed information, a second display position for the detailed information may be included in a region disposed at one side corresponding to the determined direction in the second region disposed at both sides with respect to the first region, and when at least one portion of the second contents is the control icon, a second display position for the control icon may be included in a region disposed at the other side which differs from the one side in the second region disposed at the both sides.

According to an embodiment, in the state in which the movement of the HMD is limited, when a user input is applied, the controller may change a display position of at least one portion of the second contents, based on the user input.

According to an embodiment, when the state in which the movement of the HMD is limited is sensed, the controller may output guide information for inducing the user input.

According to an embodiment, the guide information may be implemented by applying a graphic effect to at least one portion of a region corresponding to the determined direction in the second region which is disposed next to both sides of the first region.

According to an embodiment, a priority in which a display position of the second contents is changed may be set based on a degree to which the movement of the HMD is limited.

According to an embodiment, based on the sensing result, when it is sensed that the state in which the movement of the HMD is limited is changed to a state in which the HMD is movable, the controller may restore at least one portion of the second contents, which are displayed at the second display position, to the first display position, and output the position-restored second contents.

According to an embodiment, when a state of the HMD is changed to the state in which the HMD is movable and then a user input is sensed, the controller may perform the restoration, based on the user input.

According to an embodiment, when the state of the HMD is changed to the state in which the HMD is movable, the controller may output guide information for inducing the user input.

According to an embodiment, when the change is sensed in the middle of inputting a control command for one of a plurality of the second contents which are displayed at the second display position, an operation of restoring a display position of the one second contents may be performed based on that the control command is ended.

According to another aspect of the present invention, a method of controlling a head mounted display (HMD) includes: displaying first contents in a first region, and displaying second contents associated with the first contents in a second region which is disposed next to both sides of the first region; sensing a motion of a head of a user wearing the HMD in a state where the HMD is worn on the head of the user; based on the sensing result, when a state in which a movement of the HMD is limited is sensed, determining a direction in which the movement of the HMD is limited; and changing a display position of at least one portion of second contents which are displayed in a region corresponding to the determined direction in the second region which is disposed next to both sides of the first region, wherein the changing of the display position includes, when the at least one portion of the second contents is displayed at a first display position in the region corresponding to the determined direction, determining a display position of the at least one portion of the second contents so that the at least one portion of the second contents is displayed at a second display position which differs from the first display position, and displaying the at least one portion of the second contents at the second display position, based on the determination.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings:

FIGS. 3A and 3B are conceptual diagrams for describing the control method of FIG. 2;

FIGS. 5A and 5B, FIGS. 6A and 6B, FIGS. 7A and 7B, FIGS. 8A to 8C, FIGS. 9A and 9B, and FIG. 10 are conceptual diagrams for describing a method of changing a display position of contents displayed by the HMD according to an embodiment of the present invention in a state where a movement of the HMD is limited; and FIGS. 11A to 11C are conceptual diagrams for describing a method of restoring contents, whose a position is changed, when the HMD according to an embodiment of the present invention is changed from a movement-limited state to a movable state.

DETAILED DESCRIPTION OF THE DISCLOSURE

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Figure 1:
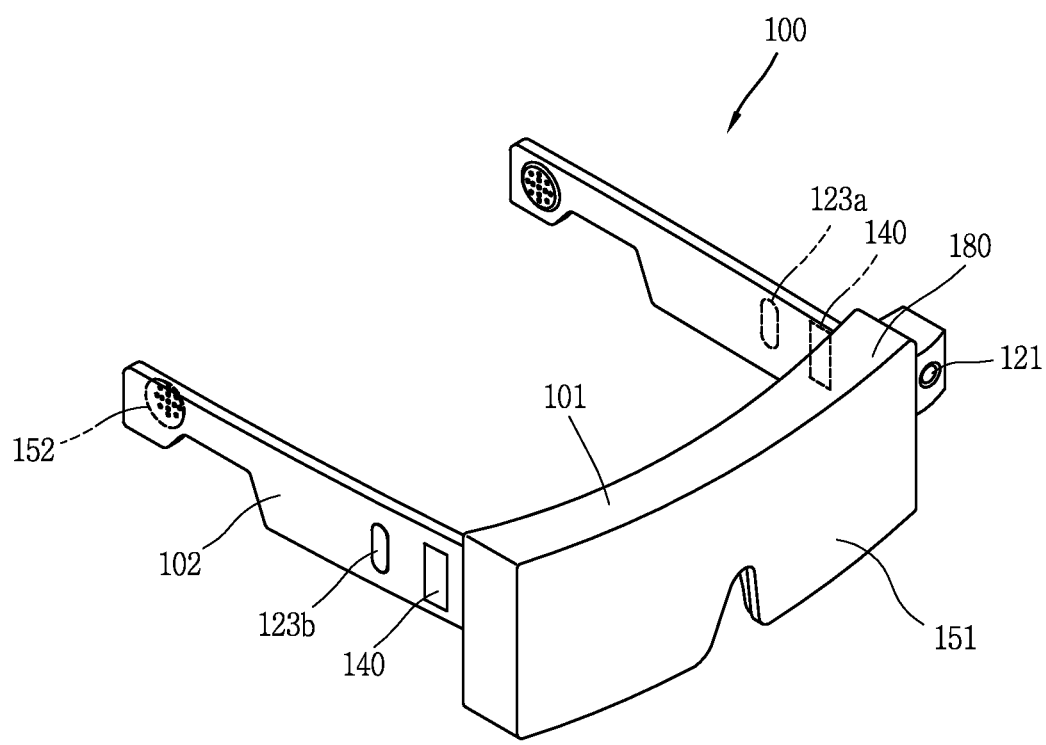
FIG. 1 is a conceptual diagram for describing an HMD according to an embodiment of the present invention.

Referring to FIG. 1, FIG. 1 is a conceptual diagram for describing an HMD according to an embodiment of the present invention.

The head mounted display 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

The head mounted display 100 according to another exemplary embodiment. The head mounted display 100 can be wearable on a head of a human body and provided with a frame (case, housing, etc.) therefor. The frame may be made of a flexible material to be easily worn. The frame of head mounted display 100 is shown having a first frame 101 and a second frame 102, which can be made of the same or different materials.

The frame may be supported on the head and defines a space for mounting various components. As illustrated, electronic components, such as the controller 180, the sensing unit 140, the user input unit 123, the audio output module 152, and the like, may be mounted to the frame part. Also, the display unit 151 for covering one of a left eye or a right eye may be detachably mounted to the frame.

The controller 180 controls various electronic components disposed in the head mounted display 100. The control module 180 may be understood as a component corresponding to the aforementioned controller 180. FIG. 1 illustrates that the controller 180 is installed in the frame part on one side of the head, but other locations are possible.

The display unit 151 may be implemented as a head mounted display (HMD). The HMD refers to display techniques by which a display is mounted to a head to show an image directly in front of a user's eyes. In order to provide an image directly in front of the user's eyes when the user wears the head mounted display 100, the display unit 151 may be located to correspond to either or both of the left and right eyes. FIG. 1 illustrates that the display unit 151 is located on a portion to cover the right eye and the left eye to output images viewable by the user's right eye and left eye.

The display unit 151 may project an image into the user's eye using a prism. Also, the prism may be formed from optically transparent material such that the user can view both the projected image and a general visual field (a range that the user views through the eyes) in front of the user.

In such a manner, the image output through the display unit 151 may be viewed while overlapping with the general visual field. The head mounted display 100 may provide an augmented reality (AR) by overlaying a virtual image on a realistic image or background using the display.

The camera 121 may be located adjacent to either or both of the left and right eyes to capture an image. Since the camera 121 is located adjacent to the eye, the camera 121 can acquire a scene that the user is currently viewing.

In the drawings, the camera 121 is provided at the controller 180. However, the present invention is not limited to this. The camera 121 may be installed at the frame. In some embodiments, multiple cameras 121 may be utilized. Such multiple cameras 121 may be used to acquire a stereoscopic image.

The head mounted display 100 may include user input units 123a and 123b, which can each be manipulated by the user to provide an input. The user input units 123a and 123b may employ techniques which permit input via a tactile input. Typical tactile inputs include a touch, push, or the like. The user input units 123a and 123b are shown operable in a pushing manner and a touching manner as they are located on the frame part and the controller 180, respectively.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The head mounted display 100 may be configured to utilize information obtained from sensing unit 140, and in particular, information obtained from one or more sensors of the sensing unit 140, and combinations thereof.

If desired, the head mounted display 100 may include a microphone (not shown) which processes input sound into electric audio data, and an audio output module 152 for outputting audio. The audio output module 152 may be configured to produce audio in a general audio output manner or an osteoconductive manner. When the audio output module 152 is implemented in the osteoconductive manner, the audio output module 152 may be closely adhered to the head when the user wears the head mounted display 100 and vibrate the user's skull to transfer sounds.

Although not shown, the head mounted display 100 may include a wireless communication unit (not shown), an interface unit (not shown), a memory (not shown), a power supply unit (not shown), etc.

The wireless communication unit typically includes one or more components to authorize radio communication between the head mounted display 100 and a wireless communication system, between the head mounted display 100 and an external device, between the head mounted display 100 and a remote controller, or between the head mounted display 100 and an external server. The wireless communication unit may include one or more modules for connecting the head mounted display 100 to one or more networks.

The wireless communication unit may include at least one of a broadcast receiving module, a mobile communication module, a wireless Internet module, a short range communication module and a location information module.

The interface unit serves as an interface with every external device connected with the head mounted display 100. For example, the interface unit may include wired or wireless headset ports, external power supply ports, wired or wireless data ports, memory card ports, ports for connecting a device having an identification module, audio input/output (I/O) ports, video I/O ports, earphone ports, or the like. In a case where an external device is connected to the interface unit, the head mounted display 100 may properly control the external device.

The memory is typically implemented to store data to support various functions or features of the head mounted display 100. For instance, the memory may be configured to store application programs executed in the head mounted display 100, data or instructions for operations of the head mounted display 100, and the like. Some of these application programs may be downloaded from an external server via wireless communication. Other application programs may be installed within the head mounted display 100 at time of manufacturing or shipping, which is typically the case for basic functions of the head mounted display 100 (for example, receiving a call, placing a call, receiving a message, sending a message, and the like). It is common for application programs to be stored in the memory, installed in the head mounted display 100, and executed by the controller 180 to perform an operation (or function) for the head mounted display 100.

The controller 180 typically functions to control overall operation of the head mounted display 100, in addition to the operations associated with the application programs. The controller 180 may provide or process information or functions appropriate for a user by processing signals, data, information and the like, which are input or output by the various components depicted above, or activating application programs stored in the memory.

As one example, the controller 180 controls some or all of the components illustrated in FIG. 1 according to the execution of an application program that have been stored in the memory. The controller 180 may combine at least two of the components of the head mounted display 100, so as to drive the application program.

The power supply unit can be configured to receive external power or provide internal power in order to supply appropriate power required for operating elements and components included in the head mounted display 100, under control of the controller 180. The power supply unit may include a battery, and the battery may be configured to be embedded in the terminal body, or configured to be detachable from the terminal body.

At least part of the components may operate in a cooperating manner, so as to implement an operation, a control or a control method of the head mounted display to be explained according to various embodiments. The operation, the control or the control method of the head mounted display may be implemented on the head mounted display, by driving of at least one application program stored in the memory.

The above components will be explained in more detail with reference to FIG. 1, before various embodiments of the head mounted display 100 are explained.

The user input unit 123 is a component that permits input by a user. Such user input unit may enable the controller 180 to control operation of the head mounted display 100. The user input unit 123 may include one or more of a mechanical input element (for example, a key, a button located on a front and/or rear surface or a side surface of the head mounted display 100, a dome switch, a jog wheel, a jog switch, and the like), or a touch-sensitive input, among others.

The sensing unit 140 is generally configured to sense one or more of internal information of the head mounted display, surrounding environment information of the head mounted display, user information, or the like. The controller 180 generally cooperates with the sending unit 140 to control operation of the head mounted display 100 or execute data processing, a function or an operation associated with an application program installed in the head mounted display based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the head mounted display covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

A touch sensor can sense a touch applied to the touch screen, such as display unit 151 or user input units 123*a* and 123*b*, using any of a variety of touch methods. Examples of such touch methods include a resistive type, a capacitive type, an infrared type, and a magnetic field type, among others.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the head mounted display 100 or a currently executed application program, for example.

The touch sensor and the proximity sensor may be implemented individually, or in combination, to sense various types of touches applied to the user input units 123*a* and 123*b*, and the display unit 151. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the head mounted display 100. For example, the display unit 151 may display execution screen information of an application program executing at the head mounted display 100 or user interface (UI) and graphic user interface (GUI) information in response to the execution screen information. Hereinafter, execution screen information of the application program will be referred to as 'first content', and UI and GUI information according to the execution screen information will be referred to as 'second content'.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the head mounted display 100. The audio output module 152 may also be implemented as a receiver, a speaker, a buzzer, or the like.

A haptic module (not shown) can be configured to generate various tactile effects that a user feels, perceive, or otherwise experience. A typical example of a tactile effect generated by the haptic module is vibration. The strength, pattern and the like of the vibration generated by the haptic module can be controlled by user selection or setting by the controller. For example, the haptic module may output different vibrations in a combining manner or a sequential manner.

Besides vibration, the haptic module can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module can also be implemented to allow the user to feel a tactile effect through a muscle sensation such as the user's fingers or arm, as well as transferring the tactile effect through direct contact. Two or more haptic modules may be provided according to the particular configuration of the head mounted display 100.

Regarding the wireless communication unit, the broadcast receiving module is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules may be provided to the head mounted display 100 so as to facilitate simultaneously receiving of two or more broadcast channels, or to support switching among broadcast channels.

The mobile communication module can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module include audio call signals, video (telephony) call signals, or various formats of data to support communication of text and multimedia messages.

The wireless Internet module is configured to facilitate wireless Internet access. This module may be internally or externally coupled to the head mounted display 100. The wireless Internet module may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module performs such wireless Internet access. As such, the Internet module may cooperate with, or function as, the mobile communication module.

The short-range communication module is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the head mounted display 100 and a wireless communication system, between the head mounted display 100 and an external device, between the head mounted display 100 and a remote controller, or between the head mounted display 100 and an external server, via wireless area networks. One example of the wireless area networks is a wireless personal area networks.

In some embodiments, the external device may be a mobile terminal which can exchange data with the head mounted display 100, a wearable device (for example, a smart watch), a smart glass or a remote controller. The short-range communication module 114 may sense or recognize the wearable device, and permit communication between the wearable device and the head mounted display 100. In addition, when the sensed wearable device is a device which is authenticated to communicate with the head mounted display 100, the controller 180, for example, may cause transmission of data processed in the head mounted display 100 to the wearable device via the short-range communication module 114. Hence, a user of the wearable device may use the data processed in the head mounted display 100 on the wearable device. For example, when content is played in the head mounted display 100, the user may play the content using the wearable device. Also, when a message is received in the head mounted display 100, the user can check the received message using the wearable device.

The location information module is generally configured to detect, calculate, derive or otherwise identify a position of the head mounted display. As an example, the location information module 115 includes a Global Position System (GPS) module, a Wi-Fi module, or both. If desired, the location information module may alternatively or additionally function with any of the other modules of the wireless communication unit to obtain data related to the position of the head mounted display. As one example, when the head mounted display uses a GPS module, a position of the head mounted display may be acquired using a signal sent from a GPS satellite. As another example, when the head mounted display uses the Wi-Fi module, a position of the head mounted display can be acquired based on information related to a wireless access point (AP) which transmits or receives a wireless signal to or from the Wi-Fi module. If necessary, the location information module may perform one of functions of the wireless communication unit, so as to acquire data on a position of the head mounted display, in a substituting or adding manner. The location information module serves to obtain a position (current position) of the head mounted display, which is not limited to a module for directly calculating or acquiring a position of the head mounted display.

The interface unit serves as an interface for external devices to be connected with the head mounted display 100. For example, the interface unit can receive data transmitted from an external device, receive power to transfer to elements and components within the head mounted display 100, or transmit internal data of the head mounted display 100 to such external device. The interface unit may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the head mounted display 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the head mounted display 100 via the interface unit.

When the head mounted display 100 is connected with an external cradle, the interface unit can serve as a passage to allow power from the cradle to be supplied to the head mounted display 100 or may serve as a passage to allow various command signals input by the user from the cradle to be transferred to the head mounted display there through. Various command signals or power input from the cradle may operate as signals for recognizing that the head mounted display 100 is properly mounted on the cradle.

The memory can store programs to support operations of the controller 180 and store input/output data (for example, phonebook, messages, still images, videos, etc.). The memory may store data related to various patterns of vibrations and audio which are output in response to touch inputs on the touch screen.

The memory may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The head mounted display 100 may also be operated in relation to a network storage device that performs the storage function of the memory over a network, such as the Internet.

As aforementioned, the controller 180 controls an operation associated with an application program, and an overall operation of the head mounted display 100. For instance, if a status of the head mounted display 100 satisfies a preset condition, the controller may control content output to the display unit 151, or may change a display position of the content.

In addition, the controller 180 can control one or a combination of those components in order to implement various exemplary embodiments of the head mounted display 100 disclosed herein.

The power supply unit receives external power or provide internal power and supply the appropriate power required for operating respective elements and components included in the head mounted display 100. The power supply unit may include a battery, which is typically rechargeable or be detachably coupled to the frame (body) of the head mounted display 100 for charging.

The power supply unit may include a connection port. The connection port may be configured as one example of the interface unit to which an external charger for supplying power to recharge the battery is electrically connected.

As another example, the power supply unit may be configured to recharge the battery in a wireless manner without use of the connection port. In this example, the power supply unit can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

A head mounted display (HMD) 100 according to an embodiment of the present invention, which includes at least one or more of the above-described elements, may display contents in the display unit 151, based on a user request. Here, the contents may be various types of information able to be displayed in the display unit 151 of the HMD 100. For example, the contents may include an application, a music, a still image, a moving image, and a control icon for controlling the same. Also, the contents may include detailed information associated with a function (for example, the application, the music, the still image, and the moving image) which is being executed by the HMD 100.

Moreover, according to an embodiment, the HMD 100 may include a plurality of user input units 123a and 123b that are disposed at a left side and a right side, and receive a user input for controlling the contents. The control icon may be placed in at least one of regions corresponding to the left side and the right side. A controller 180 may control contents (a control icon) displayed in at least one of the regions corresponding to the left side and the right side.

For example, the HMD 100 according to an embodiment of the present invention may control contents (a control icon) displayed in a region corresponding to the left side by using the user input unit 123a (hereinafter referred to as a left user input unit) which is disposed at the left side. Also, the HMD 100 may control contents (a control icon) displayed in a region corresponding to the right side by using the user input unit 123b (hereinafter referred to as a right user input unit) which is disposed at the right side.

In a state where the contents are displayed, a sensing unit 140 of the HMD 100 may sense at least one of a movement and a posture of the HMD 100, a posture and a motion of the user wearing the HMD 100, and an ambient condition of the HMD 100. The ambient condition of the HMD 100 may include a case in which an object is adjacent to the HMD 100. The controller 180 may determine whether a sensing result satisfies a predetermined condition. The predetermined condition may include a state in which the HMD 100 being moved in one of a left direction and a right direction (the HMD 100 being moved to a head of the user wearing the HMD 100) is limited. A movement of the HMD 100 being limited may denote a state in which a user input, which is applied through one of the plurality of user input units 123a and 123b included in the HMD 100, is limited. The predetermined condition will be described below in more detail with reference to FIGS. 4A to 4C.

For example, when it is determined based on the sensing result that a user input applied through the left user input unit 123a is limited, the controller 180 may change a display position of contents, which are displayed in a region iii corresponding to the left side, to a region corresponding to the right side. That is, the controller 180 may move contents, which are displayed in the region corresponding to the left side, to the region corresponding to the right side. Also, when it is determined based on the sensing result that a user input applied through the right user input unit 123b is limited, the controller 180 may change a display position of contents, which are displayed in the region corresponding to the right side, to the region corresponding to the left side.

As described above, in an operation of controlling contents displayed by the display unit 151, even when an input applied through one of the user input units disposed at the left side and the right side is limited, the present invention may change a display position of the contents to control the contents by using an input, which is applied through one of the user input units, and an input applied through the other. Therefore, the user can freely control contents in a state of wearing the HMD 100.

Figure 2:
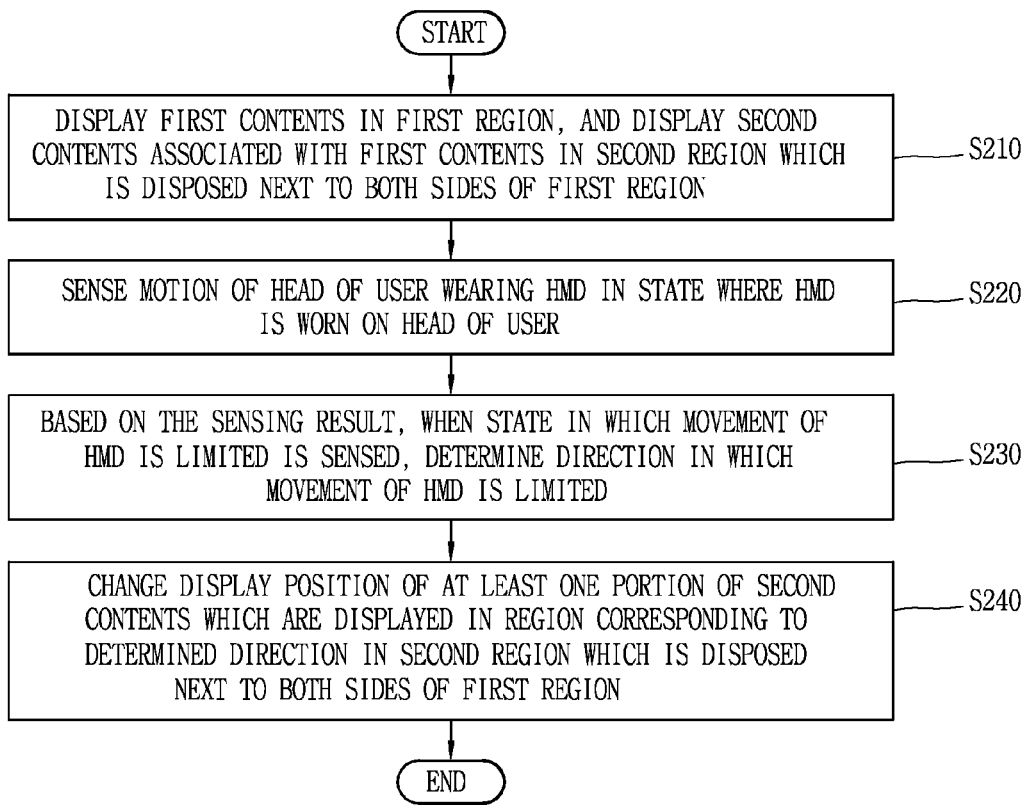
FIG. 2 is a flowchart representatively illustrating a control method according to an embodiment of the present invention.
Figure 4A:
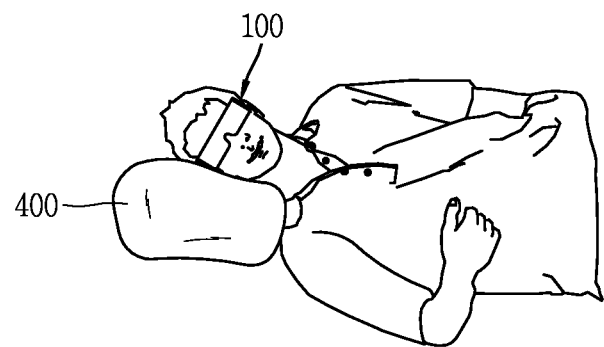
FIGS. 4A to 4C are conceptual diagrams for describing a state in which a movement of an HMD according to an embodiment of the present invention is limited.
Figure 4B:
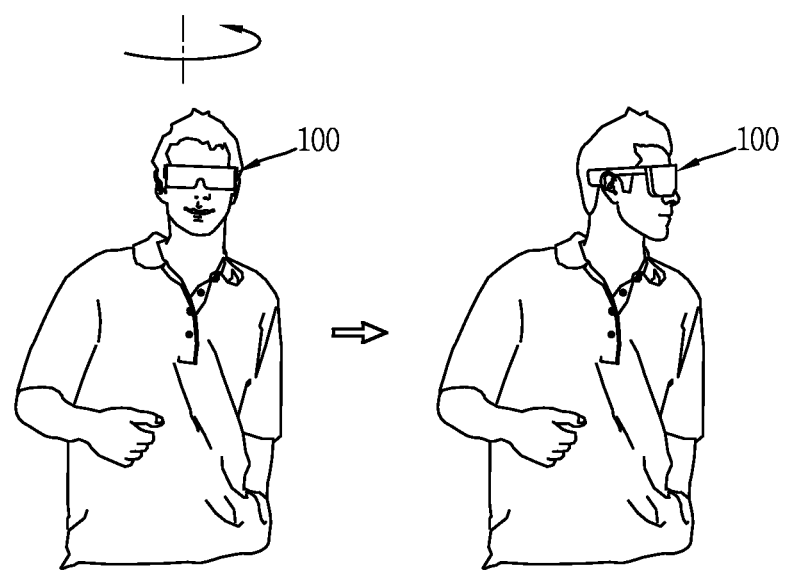
Figure 4C:
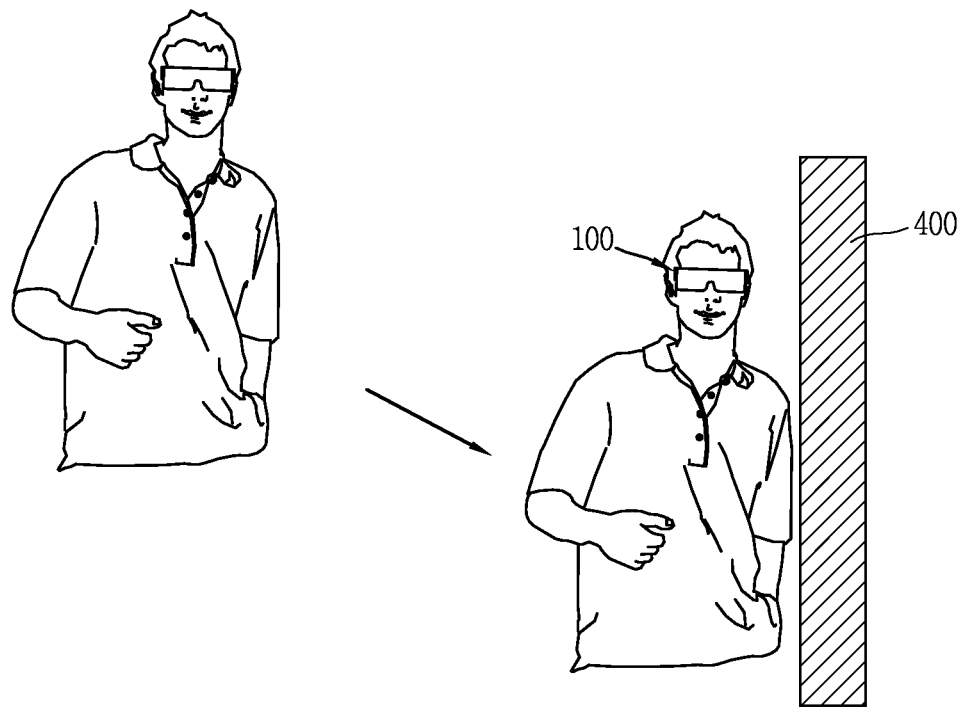

Hereinafter, an HMD and a method of controlling the same, which provide a new user interface on the basis of a state of the HMD, will be described in more detail with reference to the accompanying drawings. FIG. 2 is a flowchart representatively illustrating a control method according to an embodiment of the present invention. FIGS. 3A and 3B are conceptual diagrams for describing the control method of FIG. 2. FIGS. 4A to 4C are conceptual diagrams for describing a state in which a movement of an HMD according to an embodiment of the present invention is limited.

Referring to FIGS. 2 and 3A, in operation S210, first contents 310 and second contents 320 associated with the first contents 310 are displayed by the display unit 151. Here, the first contents 310 are displayed in a first region 210, and the second contents 320 are placed next to both sides of the first region 210.

The display unit 151 may include at least one output region that displays contents. The output region may be formed as one region so as to correspond to a size of the display unit 151. Alternatively, the output region may be divided into two regions so as to respectively correspond to a left eye and a right eye, or may be divided into at least three regions. A shape of the output region may be determined based on a selection of a user, or may be determined according to control by the controller 180.

Hereinafter, a case in which the output region of the display unit 151 is divided into at least three regions will be described as an example. According to details to be described below, in addition to the case in which the output region of the display unit 151 is divided into at least three regions, the output region may be formed as one region so as to correspond to the size of the display unit 151, or the output region may be divided into two regions so as to respectively correspond to a left eye and a right eye. The details may be identically or similarly applied to various embodiments.

When the output region is divided into at least three regions, as illustrated in FIG. 3A (a), the display unit 151 may include a first region 210 and a second region 220 which is disposed next to both sides of the first region 210. The second region 220 may include a region (hereinafter referred to as a left second region) corresponding to a left side and a region (hereinafter referred to as a right second region) corresponding to a right side.

The first contents 310 displayed in the first region 210 and the second contents 320, which are displayed in the second region 320 disposed next to both sides of the first region 210, may be various types of information which are displayed in the display unit 151 of the HMD 100. For example, the first contents 310 may include various multimedia contents such as an application, a music, a still image, and a moving image. The kind of the first contents 310 displayed by the display unit 151 may be determined based on a selection of the user, or may be determined according to control by the controller 180.

Moreover, the second contents 320 may be contents associated with the first contents 310. For example, the second contents 320 may include a graphic object (a control icon and a control user interface (UI)) for controlling the application, the music, the still image, and the moving image and detailed information associated with the application, the still image, and the moving image. The controller 180 may control the first contents 310, based on a user input (manipulation) applied to the second contents 320. Also, the controller 180 may display detailed information of the first contents 310 in at least one portion of the second region 320.

Moreover, a meaning of displaying contents in the display unit 151 may be understood as including 'an execution screen of contents is displayed, 'an execution screen of an application is displayed', 'a still image is displayed', 'a reproduction screen of a moving image is displayed', and 'a graphic object is displayed'.

The left second region may be controlled by the left user input unit 123*a* of the HMD 100, and the right second region may be controlled by the right user input unit 123*b* of the HMD 100. A meaning of controlling the second region 220 may denote controlling all kinds of screen information (for example, contents) included in the second region 220. That is, the second contents 320 which is displayed in the left second region of the second region 220 may be controlled by the left user input unit 123*a*, and the second contents 320 which is displayed in the right second region of the second region 220 may be controlled by the right user input unit 123*a*.

An indicator may be displayed in the display unit 151. The indicator may be a border shape indicating a point in which a cursor or an icon is selected. By using the indicator, the controller 180 may control the right second region, based on a user input applied to the left user input unit 123*a*, or may control the left second region, based on a user input applied to the right user input unit 123*b*.

Moreover, according to the present embodiment, in addition to the second region, the first region 210 may be controlled through the user input unit 123. For example, the controller 180 may enlarge or reduce contents which is displayed in the first region 210, based on a user input applied through the user input unit 123.

In the present invention, contents displayed by the display unit 151 may be controlled by a remote controller (not shown). The remote controller may have a ring shape which is capable of being put on the user's finger, or have a mouse shape which is capable of being grasped with the user's one hand. The remote controller, as described above, may communicate with the HMD 100 by using a wired/wireless communication scheme.

Moreover, in the present invention, a function of the user input unit 123 may be performed by the remote controller. The remote controller may be provided as at least one or more. For example, the remote controller may be worn on each of both hands of the user, and may receive a user input. Subsequently, the controller 180 may perform control for the left second region, based on a user input which is applied through the remote controller worn on a left hand, and based on a user input which is applied through the remote controller worn on a right hand, the controller 180 may perform control for the right second region. However, the present invention is not limited thereto, and various modifications may be implemented. For example, the controller 180 may perform control for the left second region by using the remote controller worn on the right hand (vice versa), or by using the remote controller, the controller 180 may perform control for the first region.

In operation S220, in a state where the HMD 100 is worn on the user's head, the sensing unit 140 according to an embodiment of the present invention may sense a motion of the user's head wearing the HMD 100.

In more detail, in a state where the first and second contents 310 and 320 are displayed in operation S210, the sensing unit 140 of the HMD 100 may sense at least one of a movement and a posture of the HMD 100, a posture and a motion of the user wearing the HMD 100, and an ambient condition of the HMD 100. For example, the ambient condition of the HMD 100 may include a case in which an object is adjacent to the HMD 100. The motion of the user's head wearing the HMD 100 may include a case in which the head moves in one of a up direction, a down direction, a left direction, and a right direction with respect to the HMD 100, or turns or is inclined in one direction with respect to the HMD 100.

Subsequently, in operation S230, based on a sensing result which is obtained through sensing in operation S220, the controller 180 according to an embodiment of the present invention may sense (or decide or determine) a state in which a movement of the HMD 100 is limited, and determine a direction in which the movement of the HMD 100 is limited.

The movement of the HMD 100 denotes that the HMD 100 is moved dependent on the motion of the user's head wearing the HMD 100. That is, sensing the motion of the user's head wearing the HMD 100 may be understood as sensing the movement of the HMD 100.

Moreover, the controller 180 may sense (determine) a state in which the movement of the HMD 100 is limited, based on the sensing result. The state in which the movement of the HMD 100 is limited may denote a state in which a user input is limited for one of at least two user input units 123 included in the HMD 100.

Moreover, the state in which the movement of the HMD 100 is limited may denote that the motion of the user's head wearing the HMD 100 satisfies a predetermined condition. The predetermined condition may be variously set. That is, a state of satisfying the predetermined condition may denote a state in which since the movement of the HMD 100 is limited, an input is limited for one of a plurality of the user input units 123.

For example, the state in which the movement of the HMD 100 is limited may include at least one of a case in which the HMD 100 is inclined to correspond to a predetermined angle according to the movement, a case in which the HMD 100 rotates to correspond to a predetermined distance according to the movement, and a case in which an object is within a predetermined distance from the HMD 100 according to the movement.

For example, as illustrated in FIG. 4A, the state in which the movement of the HMD 100 is limited may include a case (for example, a case in which the user lies on its side) in which the HMD 100 is inclined to correspond to a predetermined angle according to the movement of the user's head wearing the HMD 100 or a case in which an object 400 is within a predetermined distance from the HMD 100.

Therefore, in the HMD 100, a user input may be limited for one of the plurality of user input units.

As another example, as illustrated in FIG. 4B, the state in which the movement of the HMD 100 is limited may include a case in which the HMD 100 rotates to correspond to a predetermined distance according to the movement of the user's head wearing the HMD 100. In this case, the user's head turns in a state where the user's body is fixed, and thus, a user input may be limited for a user input unit which is provided in a turned direction.

As another example, as illustrated in FIG. 4C, the state in which the movement of the HMD 100 is limited may include a case (for example, a case in which the user lies on its side) in which an object 400 is within a predetermined distance from the HMD 100 according to the movement of the user's head wearing the HMD 100. In a case where the object 400 is within the predetermined distance from the HMD 100, the controller 180 may determine that a user input, applied through a user input unit which is provided in a direction where there is the object 400, is limited.

When a state in which the movement of the HMD 00 is limited is sensed, the controller 180 may determine a direction in which the movement of the HMD 100 is limited. In detail, when the predetermined condition is satisfied according to the user's head (wearing the HMD 100) being moved in one direction, the controller 180 may determine that the one direction is a direction in which the movement of the HMD 100 is limited.

For example, when the HMD 100 is inclined by a predetermined distance according to the user's head (wearing the HMD 100) being moved in a left direction, the controller 180 may determine that the left direction is a movement-limited direction. As another example, when an object 400 is within a predetermined distance from the HMD 100 according to the movement of the user's head wearing the HMD 100, the controller 180 may determine that a direction in which there is the object 400 is the movement-limited direction with respect to the HMD 100.

Hereinafter, for convenience of description, a case in which the object 400 is within a predetermined distance from the HMD 100 has been described above as an example of a state in which the movement of the HMD 100 is limited. However, the present embodiment is not limited thereto. For example, a direction in which the object 400 is within the predetermined distance from the HMD 100 and a degree to which the object 400 is adjacent to the HMD 100 may be identically or similarly applied to a direction in which the user's head wearing the HMD 100 moves under the predetermined condition and a degree to which the user's head wearing the HMD 100 moves.

Subsequently, in operation S240, when a direction in which the movement of the HMD 100 is limited by the controller 180 according to an embodiment of the present invention in operation S230, the controller 180 may change a display position of at least one portion of the second contents 320 which are displayed in a region corresponding to the determined direction among the second regions 220 disposed next to both sides of the first region 210.

In more detail, when at least one portion of the second contents 320 is displayed at a first display position in a region corresponding to the determined direction, the controller 180 may determine a display position of at least one portion of the second contents 320 so that at least one portion of the second contents 320 is displayed at a second display position which differs from the first display position.

Then, the controller 180 may display at least one portion of the second contents 320 at the second display position, based on the determination.

For example, the second display position may be determined in a region corresponding to a direction opposite to the direction which is determined in operation S230. Also, the second display position may be determined in a region corresponding to the determined direction. When the second display position is determined in the region corresponding to the direction which is determined in operation S230, the second display position may be determined in the region corresponding to the direction opposite to the determined direction with respect to the first display position. Details of the second display position will be described below in detail with reference to FIGS. 8A and 8B.

The above-described details can be more clearly understood through FIGS. 3A and 3B.

First, referring to FIG. 3A, FIG. 3A (a) illustrates a scene that is shown when the display unit 151 of the HMD 100 is viewed in a state where the user wears the HMD 100. As illustrated in FIG. 3A (a), the display unit 151 may include the first region 210, which displays the first contents 310, and the second region 220 which is disposed next to both sides of the first region 210, and display the second contents 320 associated with the first contents 310. Also, the controller 180 may display the first contents 310 in the first region 210, and display the second contents 320 associated with the first contents 310 in the second region 220.

The second contents 320 may include at least one of detailed information (for example, brightness information, volume information, a title of the first contents 310, and an attribute of the first contents 310) associated with the first contents 310 and a control icon that is used to perform control associated with the first contents 310.

Subsequently, in a state where the HMD 100 is worn on the user's head, the sensing unit 140 may sense a motion of the user's head wearing the HMD 100.

Based on the sensing result, when a state in which the movement of the HMD 100 is limited is sensed, the controller 180 may determine a direction in which the movement of the HMD 100 is limited. For example, as illustrated in FIG. 3A (b), when an object 400 is within a predetermined distance from the HMD 100 according to the motion of the user's head wearing the HMD 100, the controller 180 may determine a direction in which there is the object 400.

Subsequently, the controller 180 may change a display position of at least one portion of the second contents 320 which are displayed in a region corresponding to the determined direction among the second regions 220. For example, as illustrated in FIG. 3A (b), when at least one portion of the second contents 320 is displayed at a first display position in a region corresponding to the determined direction, the controller 180 may determine a display position of at least one portion of the second contents 320 so that at least one portion of the second contents 320 is displayed at a second display position which differs from the first display position. For example, as illustrated in FIG. 3A (b), the second display position may be in a region corresponding to a direction opposite to the determined direction (a direction in which there is an object) among the second regions 220.

The controller 180 may display at least one portion of the second contents 320 at the second display position, based on the determined second display position.

Therefore, as illustrated in FIG. 3B, the user may disallow the user input 123, which is provided at one of the left side and right side of the HMD 100, to receive a user input according to the movement of the HMD 100 being limited. Even in this case, a display position of at least one portion of the second contents 320 is changed to a region corresponding to the other side, and thus, the user may control at least one portion of the second contents 320 by using the user input unit 123.

Here, at least one portion of the second contents 320 of which the display position is changed may be a control icon for performing control associated with the first contents 310 which are displayed in the first region 210, but the present embodiment is not limited thereto. For example, detailed information of the second contents 320 associated with the first contents 310 may be changed in a displayed position.

As described above, in the present invention, a new user interface may be provided based on the state of the HMD 100. In detail, in the present invention, even when an input is limited for one of the user input units which are provided at a left side and a right side, by changing a display position of the contents, the content may be controlled according to an input applied through the one use input unit and the other user input unit. Accordingly, the user can freely control contents in a state of wearing the HMD 100.

Hereinafter, various embodiments of a method of changing a display position of at least one portion of the second contents displayed in the second region will be described in more detail with reference to the accompanying drawings. FIGS. 5A and 5B, FIGS. 6A and 6B, FIGS. 7A and 7B, FIGS. 8A to 8C, FIGS. 9A and 9B, and FIG. 10 are conceptual diagrams for describing a method of changing a display position of contents displayed by the HMD according to an embodiment of the present invention in a state where a movement of the HMD is limited.

First, a direction in which a movement of the HMD 100 is limited and a region corresponding to the direction will now be described in more detail with reference to FIGS. 5A and 5B.

Figure 5A:
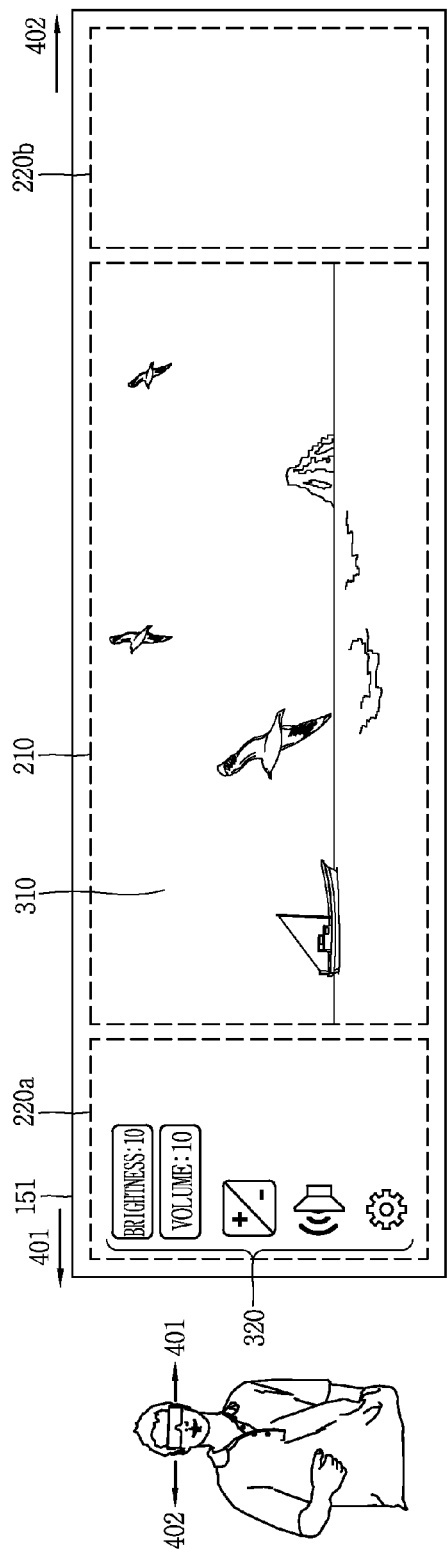

FIG. 5A (a) illustrates the display unit 151 when seen by the user in a state of wearing the HMD 100. The display unit 151 may include the first region 210, which displays the first contents 310, and the second region 220 which is disposed next to both sides of the first region 210, and display the second contents 320 associated with the first contents 310. Also, the second region 220 may include a second region 220a disposed at a left side 401 and a second region 220b disposed at a right side 402.

Moreover, in the HMD 100, the left use input unit 123a may be provided at the left side 401, and the right use input unit 123b may be provided at the right side 402. The controller 180 may control the second contents 320 displayed in the left second region 220a, based on a user input applied through the left user input unit 123a. Also, the controller 180 may control the second contents 320 displayed in the right second region 220b, based on a user input applied through the right user input unit 123b.

Subsequently, a state in which the movement of the HMD 100 is limited may be sensed according to a motion of the user's head wearing the HMD 100. At this time, as illustrated FIG. 5A (b), the controller 180 may determine a direction (for example, a left direction 401) in which the movement of the HMD 100, based on the sensing result.

The controller 180 may change a display position of at least one portion of the second contents 320 which are displayed in a region 220a corresponding to the determined direction 401 among the second regions 220. For example, as illustrated in FIG. 5A (b), when a direction in which the movement of the HMD 100 is limited is the left direction 401, the controller 180 may determine a display position so that at least one portion of the second contents 320, which are displayed at a first display position of the left second region 220a corresponding to the left direction 401, is displayed at a second display position which differs from the first display position. Then, the controller 180 may display at least one portion of the second contents 320 at the second display position.

For example, the second display position may be in the region 220b corresponding to a direction (the right direction 402) opposite to the left direction 401. As illustrated in FIG. 5A (b), the controller 180 may display at least one portion of the second contents 320, which are displayed in a region corresponding to the determined direction 401, in the region 220b corresponding to a direction opposite to the determined direction 402.

Figure 5B:
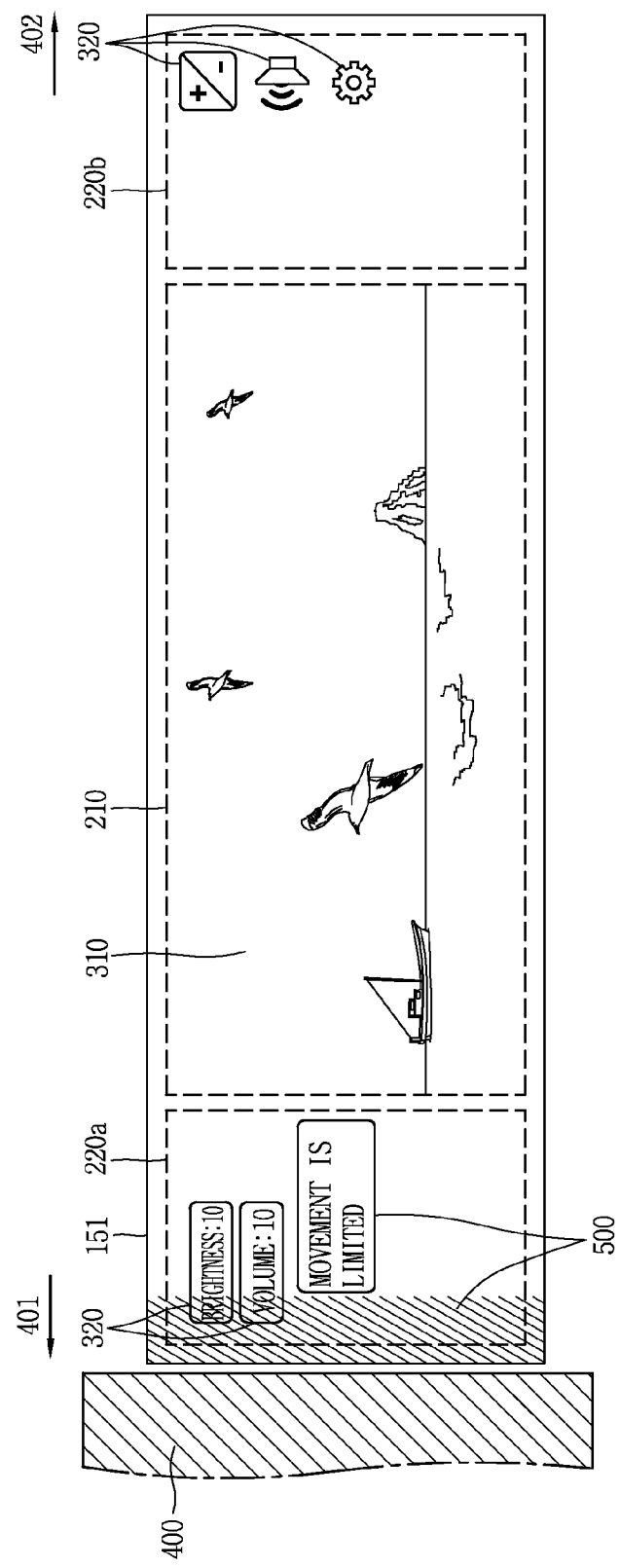

Moreover, as illustrated in FIG. 5B, when a state in which the movement of the HMD 100 is limited is sensed, the controller 180 may output notification information (for example, a graphic effect or a notification window) indicating that the movement of the HMD 100 is limited near a region corresponding to the direction 401 in which the movement of the HMD 100 is limited.

Figure 6A:
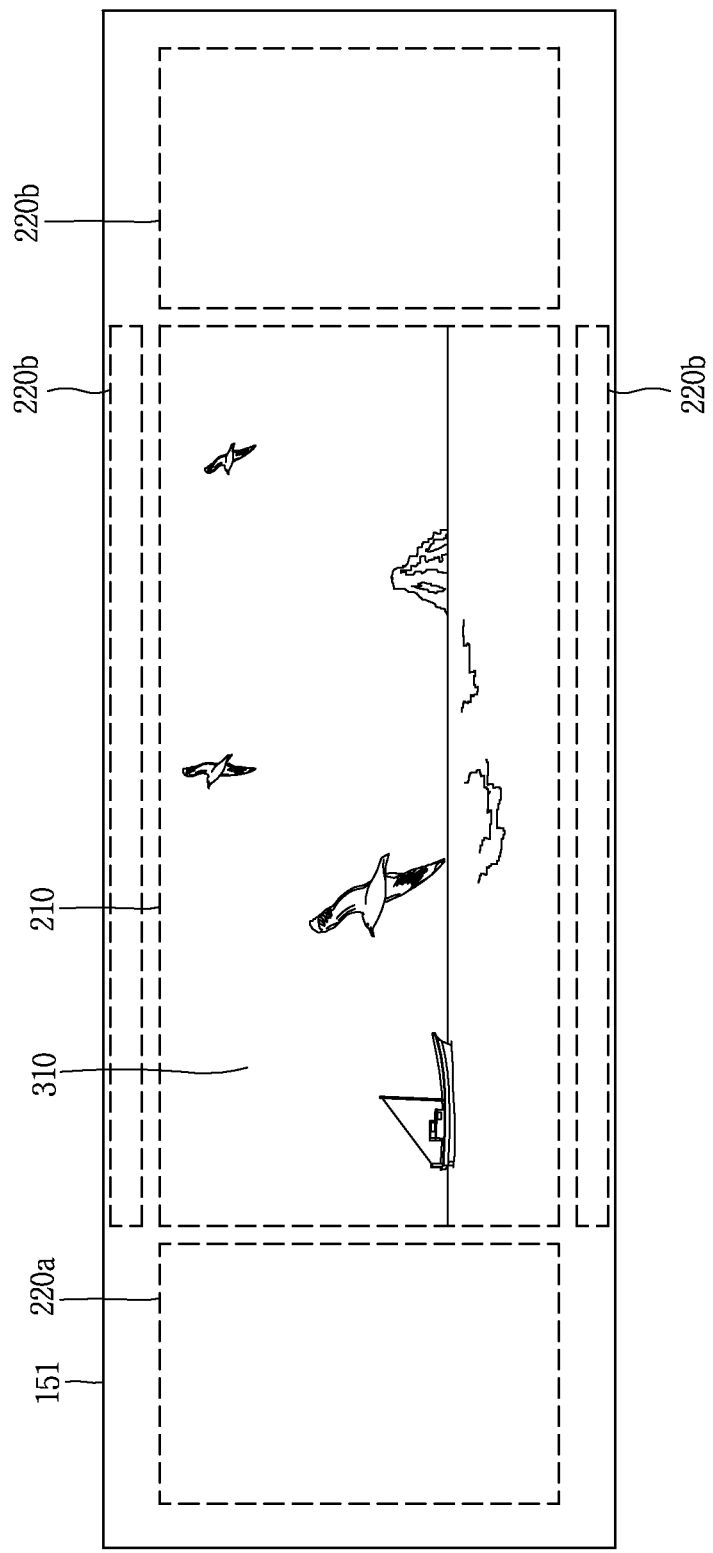

In the display unit 151, a second region 220 may be disposed at both sides with respect to a first region 210. In detail, the second region 220 disposed at both sides with respect to a first region 210 may include at least two regions 220a and 220b which are respectively disposed at a left side and a right side with respect to the first region 210, or as illustrated in FIG. 6A, the second region 220 may include at least two regions 220b which are respectively disposed at an upper side and a lower side with respect to the first region 210.

The second contents 320 may be displayed in the at least two regions which are respectively disposed at the upper side and the lower side. For example, as illustrated in FIG. 6B (a), detailed information 320b associated with the first contents 310 may be displayed in the second region disposed at the upper side, and a progress bar 320b for controlling the first contents 310 may be displayed in the second region disposed at the lower side. When the first contents are contents associated with a moving image or a music, the progress bar 320b may perform control associated with reproduction of the moving image or the music.

The second contents 320, which are displayed in the second regions 220b disposed at the upper side and the lower side, may be controlled by at least one of the left user input unit 123a and the right user input unit 123b. Although not shown, when the HMD 100 includes an upper user input unit and a lower user input unit, the second contents 320 may be controlled by the upper user input unit and the lower user input unit.

Moreover, when a state in which the movement of the HMD 100 is limited is sensed, the controller 180 may change a display position of at least one portion of the second contents which are displayed in a region corresponding to an upper side and a lower side. For example, although not shown, when the movement of the HMD 100 is limited in a lower direction, the controller 180 may move the second contents, which are displayed in a region corresponding to the lower direction, to a region corresponding to an upper direction. As another example, as illustrated in FIG. 6B (b), the controller 180 may change a display position of at least one portion of the second contents 320, which are displayed in the region 220b corresponding to the upper side and the lower side, to the region 220a corresponding to a direction (for example, a right direction) opposite to the direction (for example, a left direction) in which the movement of the HMD 100 is limited.

Therefore, in the present invention, the user can more easily control the second contents by moving the second contents, which are displayed in the region corresponding to the lower side, to a region corresponding to a direction in which the movement of the HMD is not limited.

Hereinafter, a case in which a second region is disposed at a left side and a right side with respect to a first region will be described as an example. However, the present embodiment is not limited thereto. For example, as described above, the present embodiment may be identically or similarly applied to a case in which the second region is disposed at an upper side and a lower side.

The second contents 320 may include at least one of detailed information 320a associated with the first contents 310 and a control icon 320b which is used to perform control associated with the first contents 310.

Based on that when a state in which the movement of the HMD 100 is limited is sensed, the controller 180 may move at least one portion of the control icon 320b, included in the second contents 320 displayed at a first display position, to a second display position.

At this time, the control icon 320b corresponding to the at least one portion moved to the second display position may be determined based on the kind of the first contents 310, the presence of user designation, or a degree to which the movement of the HMD 100 is limited.

For example, as illustrated in FIG. 7A (a), the display unit 151 may display the detailed information 320a associated with the first contents 310 and the control icon 320b which is used to perform control associated with the first contents 310. At this time, as illustrated in FIG. 7A (b), the controller 180 may change a display position of at least one portion of the control icon 320b to the right second region 220b, based on that when a state in which the movement of the HMD 100 is limited is sensed.

For example, in a case where a control icon associated with brightness adjustment and a control icon associated with volume adjustment are designated to be moved when a state in which the movement of the HMD 100 is limited is sensed, as illustrated in FIG. 7A (b), the controller 180 may change only a display position of the designated control icon 320b according to the presence of user designation.

As another example, the at least some control icons moved to the second display position may be determined based on the kind of the first contents 310. FIG. 7B illustrates that a still image 310 is displayed in the first region 210. As illustrated in FIG. 7B (a), the first contents 310 corresponding to the still image may be displayed in the first region 210 of the display unit 151. In this case, as illustrated in FIG. 7B (b), the controller 180 may move, to the second display position, only control icons other than the control icon associated with volume adjustment.

Hereinabove, it has been described that a display position of the control icon in the second contents is changed to a region, corresponding to a direction opposite to a direction in which the movement of the HMD 100 is limited, according to a state in which the movement of the HMD 100 is limited being sensed. Hereinafter, various embodiments in which the second contents are moved will be described in detail with reference to the accompanying drawings.

When a state in which the movement of the HMD 100 is limited is sensed, the controller 180 may determine a direction 401 in which the movement of the HMD 100 is limited. Also, based on the determined direction, the controller 180 may determine, as a second display position, a region 222 which is disposed in a direction 402 opposite to the determined direction 410 with respect to a first display position 351 among the second regions 220a and 220b.

In detail, the second contents may include at least one of the detailed information 320a associated with the first contents and the control icon 320b which is used to perform control associated with the first contents. Also, the controller 180 may differently determine a display position, in which the second contents are displayed, in the region 222 corresponding to the determined second display position according to the kinds of the second contents 320a and 320b.

For example, when at least one portion of the second contents is the detailed information 320a, the second display position for the detailed information 320a may be included in the regions 220 and 222 which are disposed at one side corresponding to the determined direction among the second regions 220 disposed at both sides with respect to the first region 210. Also, when at least one portion of the second contents is the control icon 320b, the second display position for the control icon 320b may be included in the regions 220 and 222 disposed at one side and the other side among the second regions 220 disposed at both sides.

For example, as illustrated in FIG. 8A (a), the first contents 310 may be displayed in the first region 210, and in a state where the second contents 320a and 320b are displayed in the left second region 220a, as illustrated in FIG. 8A (b), the movement of the HMD 100 in the left direction 401 may be limited according to that an object 400 is within a predetermined distance from the HMD 100. In this case, as illustrated in FIG. 8A (b), the controller 180 may determine, as a second display position, at least one portion of the region 222 which is disposed in a direction 402 opposite to the left direction 401 with respect to a first display position 351. That is, the second display position may be determined as at least one portion of the region 220a corresponding to a direction in which the movement of the HMD 100 is limited and at least one portion of the region 220b corresponding to a direction opposite to the direction in which the movement of the HMD 100 is limited.

Here, as illustrated in FIG. 8B (b), the controller 180 may move the detailed information 320a of the second contents 320, associated with the first contents, to at least one portion of the region 220a corresponding to the movement-limited direction 401 in the region 222 which is disposed in the direction 402 opposite to the movement-limited direction 401 with respect to the first display position 351. Also, the controller 180 may move the control icon 320b of the second contents 320 to at least one portion of the region 220b corresponding to the opposite direction 402 in the region 222 which is disposed in the direction 402 opposite to the movement-limited direction 401 with respect to the first display position 351.

When a state in which the movement of the HMD 100 is limited is sensed, the controller 180 may adjust (change) a size of the second region 220. In detail, when a direction in which the movement of the HMD 100 is limited is determined, the controller 180 may vary at least one size of the second region 220, based on the determined direction.

For example, as illustrated in FIG. 8C (b), when the movement of the HMD 401 in the left direction 401 is limited, the controller 180 may reduce a size of the region 220a corresponding to the left direction 401, and enlarge a size of the region 220b corresponding to the direction 402 opposite to the left direction 401. Therefore, in the present invention, since the movement of the HMD 100 is limited, the use of a user input unit which is provided in the movement-limited direction is limited, and thus, provided can be a space for more sufficiently moving the second contents to a region corresponding to a direction opposite to the movement-limited direction.

In a state in which the movement of the HMD 100 is limited, when a user input is applied to the user input unit 123, the controller 180 may change a display position of at least one portion of the second contents 320 according to the user input. That is, even when a state in which the movement of the HMD 100 is limited is sensed, the controller 180 may change a display position of at least one portion of the second contents 320 according to the user input.

Here, when a state in which the movement of the HMD 100 is limited is sensed, the controller 180 may output guide information 500 for inducing a user input. The guide information may be implemented by applying a graphic effect to at least one portion of a region corresponding to the determined direction among the second regions 220 which are disposed next to both sides of the first region 210, or may be implemented in a notification window form.

For example, in a state where first contents 310 are displayed in a first region 210 and second contents 320 are displayed in a second region 220 as illustrated in FIG. 9A (a), a state in which the movement of the HMD 100 is limited may be sensed as illustrated in FIG. 9A (b). At this time, the controller 180 may output guide information 500 for inducing a user input that changes a display position of at least one portion of the second contents 320. Subsequently, based on that the user input is applied to the user input unit 123*b* (based on the user input), the controller 180 may change a display position of at least one portion 320*b* of the second contents 320, which are displayed in the second region 220 corresponding to a direction in which the movement of the HMD 100 is limited, to the second region 220 corresponding to a direction opposite to the movement-limited direction.

Moreover, as illustrated in FIG. 9A (b), the guide information may be implemented in a notification window form, or as illustrated in FIG. 9B, the guide information may be implemented by applying a graphic effect to at least one portion of a region corresponding to the determined direction. The at least one portion of the region corresponding to the determined direction, as illustrated in FIG. 5B, may be a region itself, or may be at least one portion of the second contents which are displayed in the region corresponding to the determined direction. At least one portion of the second contents to which the graphic effect is applied may be second contents of which a display position is to be changed based on a user input.

Moreover, as illustrated in FIG. 9B, the controller 180 may output guide information 500 about a position of the user input unit to which the user input is applied. The guide information 500 about the position of the user input unit may be displayed in a region (i.e., a periphery of the user input unit to which the user input is applied) corresponding to a direction opposite to a direction in which the movement of the HMD 100 is limited.

A priority, in which a display position of the second contents is changed, may be set based on a degree to which the movement of the HMD 100 is limited. In detail, the controller 180 may differently control the changing of the display position of the second contents according to a degree to which the movement of the HMD 100 is limited.

Figure 10:
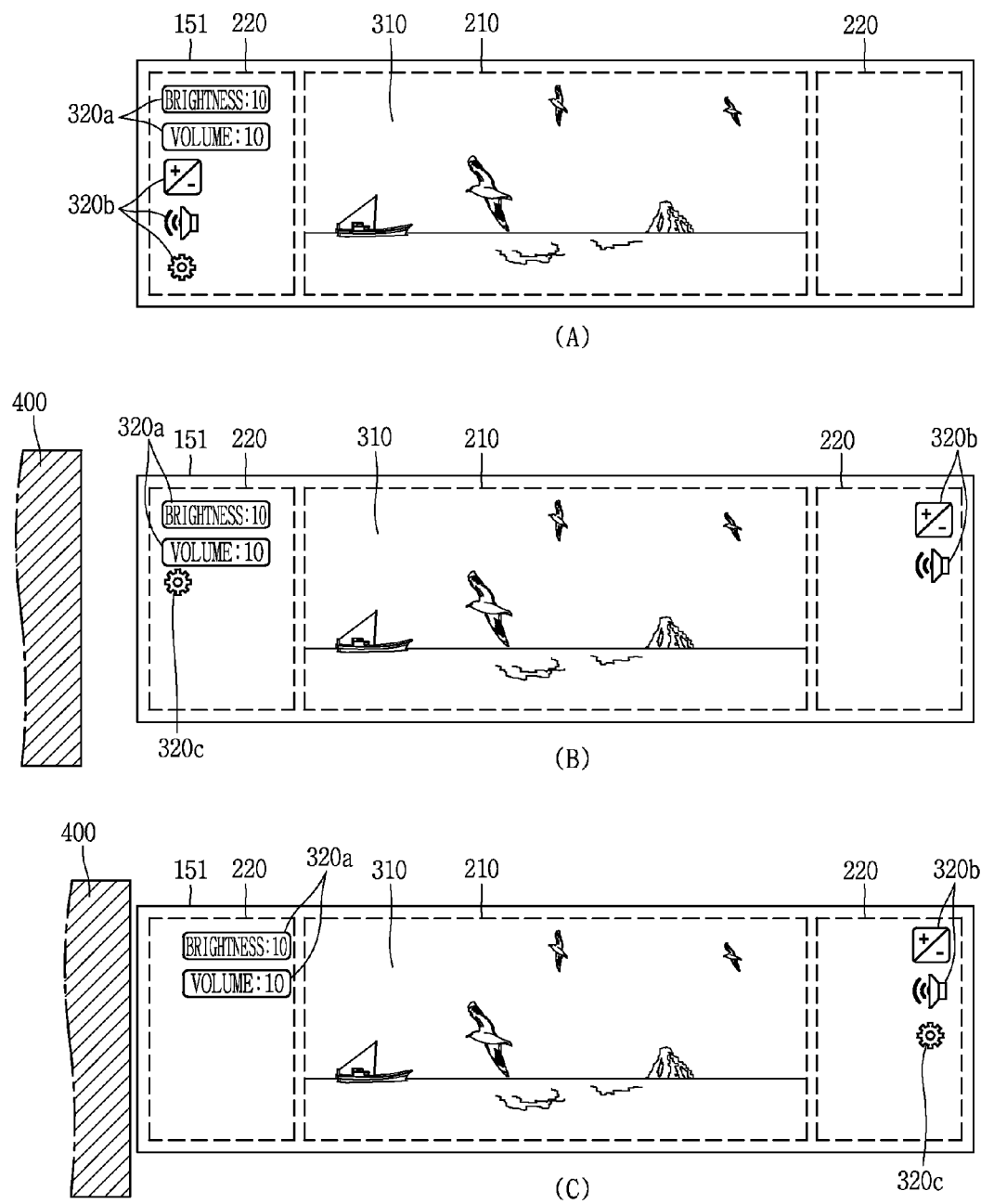

For example, in a state where second contents 320*a* and 320*b* are displayed as illustrated in FIG. 10 (*a*), when an object 400 is within a first distance from the HMD 100 as illustrated in FIG. 10 (*b*), the controller 180 may change a display position of at least one portion 320*b* of the second contents. Subsequently, as illustrated in FIG. 10 (*c*), when the object 100 is within a second distance shorter than the first distance with respect to the HMD 100, the controller 180 may change display positions of the other second contents 320*a* and 320*c* of which display positions are not changed. That is, in FIG. 10, it is illustrated that a priority of the moved at least one portion 320*b* is set higher than those of the other contents 320*a* and 320*c*, based on that the object 400 in the second contents is within the first distance.

As described above, in the present invention, a priority in which a display position is changed may be set based on a degree to which the movement of the HMD 100 is limited, and thus, an optimal user interface can be provided depending on a state of a user wearing the HMD 100.

Moreover, in the present invention, a display position of the second contents may be changed based on a state of the HMD 100, so as to easily apply a user input for controlling the second contents which are displayed in the display unit 151. Therefore, even though an input of a user input unit which is provided in one direction is limited in a state where a user wears the HMD 100, the second contents may be controlled through a user input unit which is provided in another direction, and thus, a convenience of the user increases considerably.

Hereinafter, a method in which a display position of the second contents is changed from a first display position to a second display position and then is restored from the second display position to the first display position will be described in detail with reference to the accompanying drawings. FIGS. 11A to 11C are conceptual diagrams for describing a method of restoring contents, whose a position is changed, when the HMD according to an embodiment of the present invention is changed from a movement-limited state to a movable state.

First, by inversely applying the method (described above with reference to FIGS. 2 to 10) of changing a display position of the second contents from a first display position to a second display position, the controller 180 may restore the second contents, of which a display position is changed, to the first display position.

For example, as illustrated in FIG. 11A (a), the controller 180 may change a display position of at least one of the second contents 320*a* and 320*b*, which are displayed at a first display position 351 in a second region 220, to a second display position 352 which differs from the first display position, and output corresponding contents.

The second display position 352, as illustrated in FIG. 11A (b), may be at least one portion of a region which is disposed in a direction opposite to a direction, in which the movement of the HMD 100 is limited, with respect to the first display position in the second region 220.

Subsequently, as illustrated in FIG. 11A (c), the controller 180 may be changed from a state, in which the movement of the HMD 100 is limited, to a state in which the HMD 100 is movable. When it is sensed that the state in which the movement of the HMD 100 is limited is changed to the state in which the HMD 100 is movable, the controller 180 may restore at least one portion of the second contents, which are displayed at the second display position 352, to the first display position 351, and output the position-restored second contents.

Moreover, the controller 180 may restore at least one portion of the second contents, which are displayed at the second display position 352, to the first display position 351 according to a user input, and output the position-restored second contents. In detail, when a current state is changed to a state in which the HMD 100 is movable and then a user input is sensed, the controller 180 may perform the restoration according to the user input.

At this time, when a current state is changed to a state in which the HMD 100 is movable, the controller 180 may output guide information 500 for inducing the user input.

For example, the movement of the HMD 100 is limited as illustrated in FIG. 11B (a), and thus, in a state where at least one of the second contents 320a and 320b is changed from the first display position 351 to the second display position 352 and is output, as illustrated in FIG. 11B (b), the controller 180 may sense that a current state is changed to a state in which the HMD 100 is movable. In this case, as illustrated in FIG. 11B (b), the controller 180 may output guide information 500 for inducing a user input that performs an operation of restoring the display position of the second contents. The guide information 500 may have a notification window form, or may have a graphic object form that guides a position of a user input unit to which the user input is applied.

Here, unlike in FIG. 9B, a graphic object that guides the position of the user input unit may be displayed in at least one of the left user input unit 123a and the right user input unit 123b. That is, since a current state is changed to a state in which the HMD 100 is movable, the controller 180 may receive a user input through the user input units 123a and 123b which are respectively provided at the left side and the right side. Therefore, when the user input is applied to at least one of the user input units 123a and 123b which are respectively provided at the left side and the right side, as illustrated in FIG. 11B (c), the controller 180 may restore the second contents, which are displayed at the second display position, to the first display position, and display the position-restored second contents, based on the user input.

As illustrated in FIG. 11C (a), the controller 180 may receive a control command 500 for at least one 320b of the second contents 320a and 320b which are displayed at the second display position 351.

At this time, when the change is sensed in the middle of inputting the control command 500 for the at least one 320b of the second contents which are displayed at the second display position 351, an operation of restoring a display position of the at least one second contents 320b may be performed based on that the control command 500 is ended.

For example, as illustrated in FIG. 11C (b), when a current state being changed to a state in which the HMD 100 is movable is sensed in the middle of inputting a control command for the at least one 320b of the second contents, the controller 180 may restore a display position of the second contents 320a, which differ from the at least one second contents 320b, from the second display position 352 to the first display position 351. However, the controller 180 may maintain, as the second display position 352, a display position of the at least one second contents 320b to which the control command is input. Then, based on that the control command is ended, as illustrated in FIG. 11C (c), the controller 180 may restore the display position of the at least one second contents 320b from the second display position 352 to the first display position 351, and display the position-restored second contents.

Therefore, according to the embodiments of the present invention, in one of second contents to which a control command is input, a display position of corresponding contents can be maintained even when a state of the HMD is changed. Accordingly, while a user is inputting a control command, disorder caused by the sudden restoration of second contents can be prevented.

As described above, according to the embodiments of the present invention, a motion of a user's head wearing the HMD is sensed, a display position of contents displayed in the HMD is changed based on a sensing result, and the position-changed contents are displayed. Accordingly, in the present invention, an optimal user interface can be provided depending on a state of the HMD.

Moreover, according to the embodiments of the present invention, when a movement of the HMD is limited, a display position of contents which are displayed in a region corresponding to a direction in which the movement of the HMD is limited may be changed to a region corresponding to a direction opposite to the direction. Therefore, even under a condition in which the movement of the HMD is limited to one direction and thus a control of contents is limited by using an input unit or an arm corresponding to the one direction, contents of which a display position is changed may be controlled by using an input unit or an arm corresponding to a direction opposite to the one direction, thereby increasing a convenience of a user.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the head mounted display.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A head mounted display (HMD) comprising:
    a display unit configured to include a first region, which displays first contents, and a second region which is disposed next to both sides of the first region and displays second contents associated with the first contents;
    a sensing unit configured to sense an object adjacent to the HMD in a state where the HMD is worn on the head of the user; and
    a controller configured to, based on the sensing result, when the object is sensed within a predetermined distance from the HMD, determine a direction in which the object is sensed, and change a display position of at least one portion of second contents which are displayed in a region corresponding to the determined direction in the second region which is disposed next to both sides of the first region,
wherein when the at least one portion of the second contents is displayed at a first display position in the region corresponding to the determined direction, the controller determines a display position of the at least one portion of the second contents so that the at least one portion of the second contents is displayed at a second display position which differs from the first display position, and displays the at least one portion of the second contents at the second display position, based on the determination.

2. The HMD of claim 1, wherein when a state in which a movement of the HMD is limited is sensed, the controller is configured to determine a direction in which the movement of the HMD is limited, and change a display position of the at least one portion of second contents which are displayed in a region corresponding to the direction in which the movement of the HMD is limited, and
wherein the state in which the movement of the HMD is limited is sensed based on that the motion of the head of the user wearing the HMD satisfies a predetermined condition, and
the predetermined condition comprises at least one of a case in which the HMD is inclined to correspond to a predetermined angle according to the movement, a case in which the HMD rotates to correspond to a predetermined distance according to the movement, and a case in which an object is within a predetermined distance from the HMD according to the movement.

3. The HMD of claim 2, wherein when the predetermined condition is satisfied according to the head of the user wearing the HMD being moved in one direction, the controller determines the one direction as a direction in which the movement of the HMD is limited.

4. The HMD of claim 3, wherein a region corresponding to the determined direction is a region which is disposed at a side corresponding to the one direction in the second region with respect to the first region.

5. The HMD of claim 1, wherein the second region which is disposed at both sides with respect to the first region comprises at least two regions, which are respectively disposed at a left side and a right side with respect to the first region, or at least two regions which are respectively disposed at an upper side and a lower side with respect to the first region.

6. The HMD of claim 1, wherein the second contents comprise at least one of detailed information associated with the first contents and a control icon for performing control associated with the first contents.

7. The HMD of claim 6, wherein the controller moves at least one portion of the control icon, included in the second contents displayed at the first display position, to the second display position, based on that the state in which the movement of the HMD is limited is sensed.

8. The HMD of claim 7, wherein a control icon, corresponding to the at least one portion moved to the second display position, is determined based on a kind of the first contents, the presence of user designation, or a degree to which the movement of the HMD is limited.

9. The HMD of claim 1, wherein based on the determined direction, the controller determines, as the second display position, at least one portion of a region disposed in a direction opposite to the determined direction with respect to the first display position in the second region.

10. The HMD of claim 9, wherein,
the second contents comprise at least one of detailed information associated with the first contents and a control icon for performing control associated with the first contents, and
the controller differently determines a display position, in which the second contents are displayed, in the at least one portion corresponding to the determined second display position, based on to a kind of the second contents.

11. The HMD of claim 10, wherein,
when at least one portion of the second contents is the detailed information, a second display position for the detailed information is included in a region disposed at one side corresponding to the determined direction in the second region disposed at both sides with respect to the first region, and
when at least one portion of the second contents is the control icon, a second display position for the control icon is included in a region disposed at the other side which differs from the one side in the second region disposed at the both sides.

12. The HMD of claim 1, wherein in the state in which the movement of the HMD is limited, when a user input is applied, the controller changes a display position of at least one portion of the second contents, based on the user input.

13. The HMD of claim 12, wherein when the state in which the movement of the HMD is limited is sensed, the controller outputs guide information for inducing the user input.

14. The HMD of claim 13, wherein the guide information is implemented by applying a graphic effect to at least one portion of a region corresponding to the determined direction in the second region which is disposed next to both sides of the first region.

15. The HMD of claim 1, wherein a priority, in which a display position of the second contents is changed, is set based on a degree to which the movement of the HMD is limited.

16. The HMD of claim 1, wherein based on the sensing result, when it is sensed that the state in which the movement of the HMD is limited is changed to a state in which the HMD is movable, the controller restores at least one portion of the second contents, which are displayed at the second display position, to the first display position, and outputs the position-restored second contents.

17. The HMD of claim 16, wherein when a state of the HMD is changed to the state in which the HMD is movable and then a user input is sensed, the controller performs the restoration, based on the user input.

18. The HMD of claim 17, wherein when the state of the HMD is changed to the state in which the HMD is movable, the controller outputs guide information for inducing the user input.

19. The HMD of claim 16, wherein when the change is sensed in the middle of inputting a control command for one of a plurality of the second contents which are displayed at the second display position, an operation of restoring a display position of the one second contents is performed based on that the control command is ended.

20. A method of controlling a head mounted display (HMD), the method comprising:

displaying first contents in a first region, and displaying second contents associated with the first contents in a second region which is disposed next to both sides of the first region;

sensing an object adjacent to the HMD in a state where the HMD is worn on the head of the user;

based on the sensing result, when the object is sensed within a predetermined distance from the HMD, determining a direction in which the object is sensed; and changing a display position of at least one portion of second contents which are displayed in a region corresponding to the determined direction in the second region which is disposed next to both sides of the first region, wherein the changing of the display position comprises, when the at least one portion of the second contents is displayed at a first display position in the region corresponding to the determined direction, determining a display position of the at least one portion of the second contents so that the at least one portion of the second contents is displayed at a second display position which differs from the first display position, and displaying the at least one portion of the second contents at the second display position, based on the determination.

* * * * *